US012536934B2

(12) United States Patent
Chung

(10) Patent No.: US 12,536,934 B2
(45) Date of Patent: Jan. 27, 2026

(54) DISPLAY DEVICE AND METHOD OF INSPECTING THE SAME

(71) Applicant: SAMSUNG DISPLAY CO., LTD., Yongin-si (KR)

(72) Inventor: Jae Mo Chung, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/621,848

(22) Filed: Mar. 29, 2024

(65) Prior Publication Data

US 2025/0078701 A1 Mar. 6, 2025

(30) Foreign Application Priority Data

Sep. 1, 2023 (KR) ........................ 10-2023-0116546

(51) Int. Cl.
*G09G 3/00* (2006.01)
*G09G 3/20* (2006.01)

(52) U.S. Cl.
CPC ........... *G09G 3/006* (2013.01); *G09G 3/2092* (2013.01); *G09G 2300/0413* (2013.01); *G09G 2310/027* (2013.01); *G09G 2310/0291* (2013.01); *G09G 2330/12* (2013.01)

(58) Field of Classification Search
CPC ....... G09G 3/006; G09G 3/3275–3291; G09G 3/3685–3692; G09G 2320/0693; G09G 2330/08–12; H04N 17/00–06; G02F 1/1309; G02F 1/136259
See application file for complete search history.

(56) References Cited

U.S. PATENT DOCUMENTS

| | | | | |
|---|---|---|---|---|
| 5,926,156 A * | 7/1999 | Katoh | G09G 3/3688 345/55 |
| 7,432,904 B2 * | 10/2008 | Kang | G09G 3/3688 349/55 |
| 8,451,397 B2 | 5/2013 | Chang | |
| 2018/0033353 A1 * | 2/2018 | Kim | G09G 3/20 |
| 2020/0035177 A1 * | 1/2020 | Kawachi | G11C 19/28 |
| 2022/0076599 A1 * | 3/2022 | Akyol | G09G 3/006 |

FOREIGN PATENT DOCUMENTS

KR 10-1133751 B1 4/2012

* cited by examiner

*Primary Examiner* — Roberto W Flores
(74) *Attorney, Agent, or Firm* — F. CHAU & ASSOCIATES, LLC

(57) ABSTRACT

A display device includes a display panel including a plurality of pixels connected to m data lines (where m is a positive integer greater than or equal to 3), and a data driver configured to supply a plurality of data signals to the m data lines. The data driver includes an output component and a switching component. The output component includes m source amplifiers respectively connected to the m data lines, and a first dummy source amplifier connected to a first dummy data line. The switching component includes m switches respectively formed on the m data lines, m−1 forward switches formed between adjacent data lines among the m data lines, m−1 reverse switches formed between the adjacent data lines, and a first dummy switch formed on the first dummy data line.

18 Claims, 24 Drawing Sheets

DISPLAY DEVICE AND METHOD OF INSPECTING THE SAME

CROSS-REFERENCE TO RELATED APPLICATION

This application claims priority under 35 U.S.C. § 119 to Korean Patent Application No. 10-2023-0116546, filed on Sep. 1, 2023 in the Korean Intellectual Property Office, the disclosure of which is incorporated by reference herein in its entirety.

TECHNICAL FIELD

Embodiments of the present disclosure relate to a display device and a method of inspecting the display device.

DISCUSSION OF RELATED ART

The use of various kinds of display devices, such as liquid crystal display devices and organic light-emitting display devices, has increased.

During a process of fabricating a display device, various defect inspection operations may be performed. For example, defect inspection operations may be performed to inspect for electrical defects in a driving chip due to electrostatic discharge or for bonding defects in components such as the driving chip and a flexible circuit board.

Here, the occurrence of electrical defects in the driving chip due to electrostatic discharge may occur.

SUMMARY

Embodiments of the present disclosure are directed to a display device capable of accurately inspecting a data driver (or a driving chip) for an electrical defect, and a method of inspecting the display device.

According to an embodiment of the present disclosure, a display device includes a display panel including a plurality of pixels connected to m data lines, where m is a positive integer greater than or equal to 3, and a data driver configured to supply a plurality of data signals to the m data lines. The data driver includes an output component including m source amplifiers respectively connected to the m data lines, and a first dummy source amplifier connected to a first dummy data line. The data driver further includes a switching component including m switches respectively formed on the m data lines, m−1 forward switches formed between adjacent data lines among the m data lines, m−1 reverse switches formed between the adjacent data lines, and a first dummy switch formed on the first dummy data line.

In an embodiment, the first dummy source amplifier is adjacent to a first source amplifier configured to output a data signal to a first data line among the m data lines.

In an embodiment, the first dummy data line is connected to the first data line.

In an embodiment, the first dummy switch controls whether to supply a first dummy data signal output from the first dummy source amplifier to the first data line.

In an embodiment, a k-th switch controls whether to supply a data signal among the plurality of data signals output from a k-th source amplifier among the m source amplifiers to a k-th data line among the m data lines, where k is a positive integer less than or equal to m.

In an embodiment, a p-th forward switch among the m−1 forward switches controls whether to supply a data signal among the plurality of data signals output from a p-th source amplifier among the m source amplifiers to a p+1-th data line among the m data lines, where p is a positive integer of less than or equal to m−1.

In an embodiment, a q-th reverse switch among the m−1 reverse switches controls whether to supply a data signal among the plurality of data signals output from a q-th source amplifier among the m source amplifiers to a q−1-th data line among the m data lines, where q is a positive integer less than or equal to m−1.

In an embodiment, when a defect occurs in a pixel among the plurality of pixels connected to any one data line among the m data lines other than an m-th data line among the m data lines, the m−1 forward switches and the first dummy switch are turned on, and the m switches are turned off.

In an embodiment, the output component further includes a second dummy source amplifier connected to a second dummy data line, and the switching component further includes a second dummy switch formed on the second dummy data line.

In an embodiment, the second dummy source amplifier is adjacent to an m-th source amplifier among the m source amplifiers configured to output a data signal among the plurality of data signals to an m-th data line among the m data lines.

In an embodiment, the second dummy data line is connected to the m-th data line.

In an embodiment, the second dummy switch controls whether to supply a dummy data signal output from the second dummy source amplifier to the m-th data line.

In an embodiment, when a defect occurs in a pixel among the plurality of pixels connected to an m-th data line among the m data lines, the m−1 reverse switches and the second dummy switch are turned on, and the m switches and the first dummy switch are turned off.

In an embodiment, when a defect occurs in a pixel among the plurality of pixels connected to a first data line among the m data lines and any one data line other than an m-th data line among the m data lines, the m−1 forward switches and the first dummy switch are turned on, and the m switches, the m−1 reverse switches, and the second dummy switch are turned off.

In an embodiment, when a defect occurs in a pixel among the plurality of pixels connected to an m-th data line among the m data lines and any one data line other than a first data line among the m data lines, the m−1 reverse switches and the second dummy switch are turned on, and the m switches, the m−1 forward switches, and the first dummy switch are turned off.

In an embodiment, when m is a positive integer greater than or equal to 4, when a defect occurs in a pixel among the plurality of pixels connected to any two data lines among the m data lines other than a first data line among the m data lines and an m-th data line among the m data lines, the m−1 forward switches and the first dummy switch are turned on, and the m switches, the m−1 reverse switches, and the second dummy switch are turned off, or the m−1 reverse switches and the second dummy switch are turned on, and the m switches, the m−1 forward switches, and the first dummy switch are turned off.

In an embodiment, when m is a positive integer greater than or equal to 4, when a defect occurs in a pixel among the plurality of pixels connected to a first data line among the m data lines and an m-th data line among the m data lines, the first dummy switch, a first forward switch among the m−1 forward switches, the second dummy switch, and an m−1-th reverse switch among the m−1 reverse switches are turned on, and the m switches, remaining m−2 forward switches among the m−1 forward switches, and remaining m−2 reverse switches among the m−1 reverse switches are turned off.

In an embodiment, when a defect occurs in any one source amplifier among the m source amplifiers, a first dummy data signal output from the first dummy source amplifier is supplied to a first data line among the m data lines.

In an embodiment, when a defect occurs in any two source amplifiers among the m source amplifiers, a first dummy data signal output from the first dummy source amplifier is supplied to a first data line among the m data lines, and a second dummy data signal output from the second dummy source amplifier is supplied to an m-th data line among the m data lines.

According to an embodiment of the present disclosure, a method of inspecting a display device includes supplying a plurality of data signals output from a plurality of source amplifiers to a plurality of data lines, verifying a defect in a pixel among a plurality of pixels connected to at least one data line among the plurality of data lines, supplying a data signal output from at least one source amplifier connected to the at least one data line to an adjacent data line among the plurality of data lines, and determining the defect in the at least one source amplifier based on whether a pixel among the plurality of pixels connected to the adjacent data line is defective.

In an embodiment, determining the defect includes, when the defect has occurred in the pixel connected to the adjacent data line, determining that the defect has occurred in the at least one source amplifier.

BRIEF DESCRIPTION OF THE DRAWINGS

The above and other features of the present disclosure will become more apparent by describing in detail embodiments thereof with reference to the accompanying drawings, in which.

DETAILED DESCRIPTION

Figure 1:
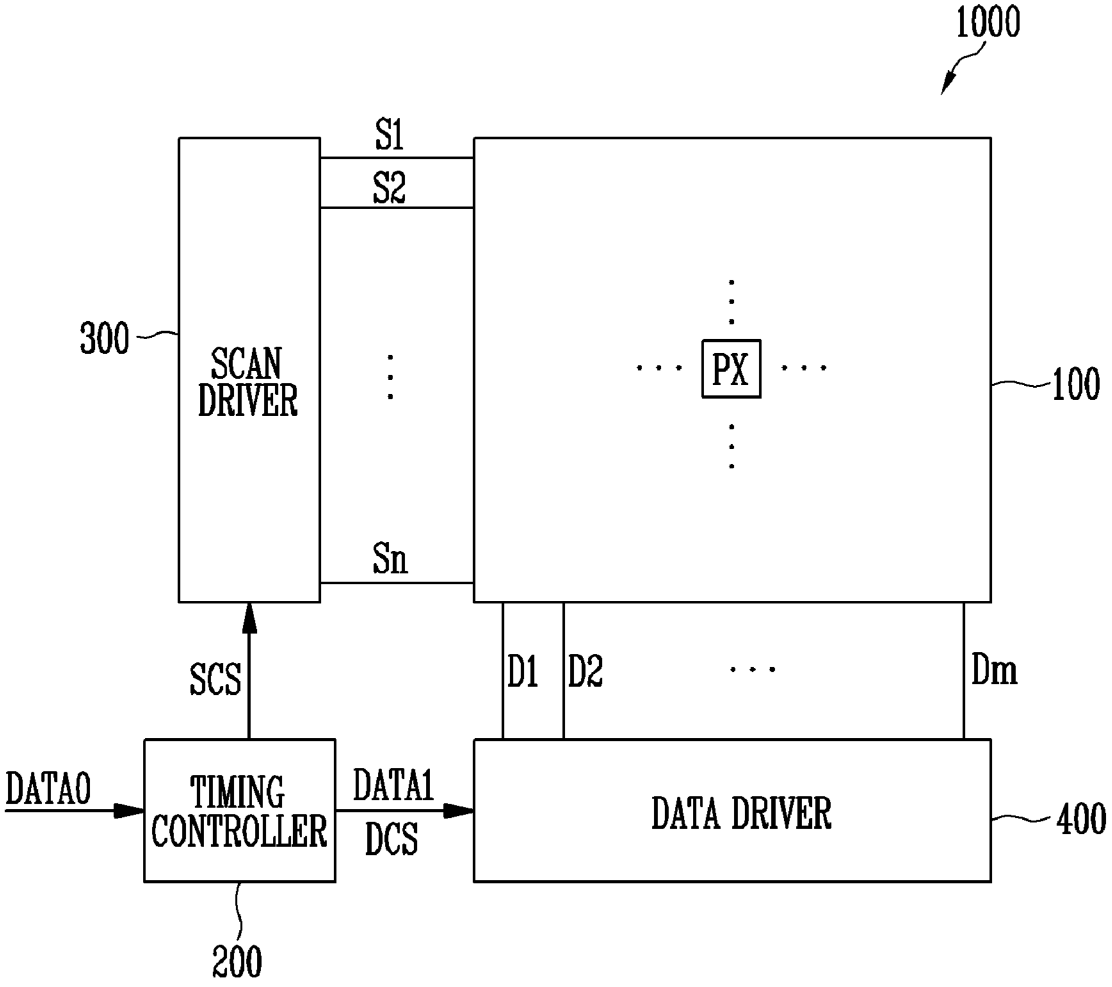
FIG. 1 is a diagram illustrating a display device in accordance with an embodiment.

Embodiments of the present disclosure will be described more fully hereinafter with reference to the accompanying drawings. Like reference numerals may refer to like elements throughout the accompanying drawings.

The terminology used herein is for the purpose of describing particular embodiments only and is not intended to be limiting of embodiments. In this specification, the terms of a singular form may include plural forms unless the context clearly indicates otherwise. It will be further understood that the terms "comprises" and/or "comprising", when used in this specification, specify the presence of stated features, steps, operations and/or components, and do not preclude the presence or addition of one or more additional features, steps, operations and/or components.

Furthermore, the term "coupling" or "connection" may comprehensively refer to physical and/or electrical coupling or connection. In addition, the term "coupling" or "connection" may comprehensively refer to direct or indirect coupling or connection and integral or non-integral coupling or connection.

It will be understood that, although the terms "first", "second", etc. may be used herein to describe various elements, these elements should not be limited by these terms. These terms may only be used to distinguish one element from another element. For instance, a first element discussed below could be termed a second element without departing from the teachings of the present disclosure.

FIG. 1 is a diagram illustrating a display device in accordance with an embodiment.

Referring to FIG. 1, the display device 1000 may include a display panel 100, a timing controller 200 (also referred to as a timing controller circuit), a scan driver 300 (also referred to as a scan driver circuit), and a data driver 400 (also referred to as a data driver circuit).

The display device 1000 may be implemented as a self-emissive display device including a plurality of self-emissive elements. For example, the display device 1000 may be an organic emission display device including organic light emitting elements, an inorganic display device including inorganic light emitting elements, or a display device including light emitting elements formed of a combination of inorganic material and organic material. However, the foregoing is illustrative, and the display device 1000 is not limited thereto. For example, according to embodiments, the display device 1000 may be implemented as a liquid crystal display device, a plasma display device, a quantum dot display device, or the like.

The display device 1000 may be, for example, a flat display device, a flexible display device, a curved display device, a foldable display device, a bendable display device, a slidable display device, or a three-dimensional display (e.g., a display device capable of displaying images not only on a front surface of the display device, but also on sides and/or a rear surface thereof).

The display panel 100 may include a plurality of scan lines S1 to Sn (where, n is a positive integer greater than or equal to 3), a plurality of data lines D1 to Dm (where, m is a positive integer greater than or equal to 3), and a plurality of pixels PX. The pixels PX may be electrically connected to the data lines D1 to Dm and the scan lines S1 to Sn. Pixels PX connected to a single scan line may be understood as being a single pixel row. For example, the pixels PX connected to the first scan line S1 may be understood as being a first pixel row. Pixels PX connected to a single data line may be understood as being a single pixel column. For example, the pixels PX connected to the first data line D1 may be understood as being a first pixel column. According to embodiments, the pixels PX may also be electrically connected to an additional emission control line.

The pixels PX may emit light with grayscale and luminance corresponding to data signals supplied from the data lines D1 to Dm. Each of the pixels PX may include a driving transistor and at least one switching transistor. The pixel PX may include, for example, an organic light emitting element, an inorganic light emitting element, or a light emitting element configured of a combination of organic material and inorganic material.

The timing controller 200 may generate a scan control signal SCS and a data control signal DCS, based on clock signals and control signals that are supplied from an external device. The scan control signal SCS may be supplied to the scan driver 300. The data control signal DCS may be supplied to the data driver 400. The timing controller 200 may rearrange input image data DATA0 supplied from an external device and supply the rearranged input image data DATA0 to the data driver 400.

The scan control signal SCS may include a scan start pulse and scan clock signals. The scan start pulse may control a first timing of a scan signal. The scan clock signals may be used to shift the scan start pulse.

The data control signal DCS may include a source start pulse and data clock signals. The source start pulse may control a sampling start time point of rearranged image data DATA1. The data clock signals may be used to control a sampling operation.

The timing controller 200 may rearrange input image data DATA0 in response to the arrangement of the pixels PX in the display panel 100 to generate image data DATA1. For example, the timing controller 200 may rearrange the input image data DATA0 in response to the arrangement of the pixels PX (e.g., pixel arrangement in FIG. 2) to generate image data DATA1 of a type where red-green-blue is repeated.

The scan driver 300 may supply scan signals to the scan lines S1 to Sn corresponding to the pixel rows, based on the scan control signal SCS. For example, the scan driver 300 may sequentially supply scan signals to the scan lines S1 to Sn. If the scan signals are sequentially supplied, the pixels PX may be activated on a horizontal line basis (or a pixel row basis).

The data driver 400 may receive the data control signal DCS and the image data DATA1. The data driver 400 may supply analog data signals, formed by converting the data signals DATA1, to the data lines D1 to Dm in response to the data control signal DCS. The data signals supplied to the data lines D1 to Dm may be supplied to pixels PX activated by the scan signals. To this end, the data driver 400 may supply the data signals to the data lines D1 to Dm in synchronization with the scan signals.

In an embodiment, the display device 1000 may further include a demultiplexer component connected between the data driver 400 and the data lines D1 to Dm. The demultiplexer component may be operated in response to control signals supplied from the timing controller 200, and may be configured with various forms of demultiplexers such as, for example, 1:2, 1:3, 1:4, and so on.

Figure 2:
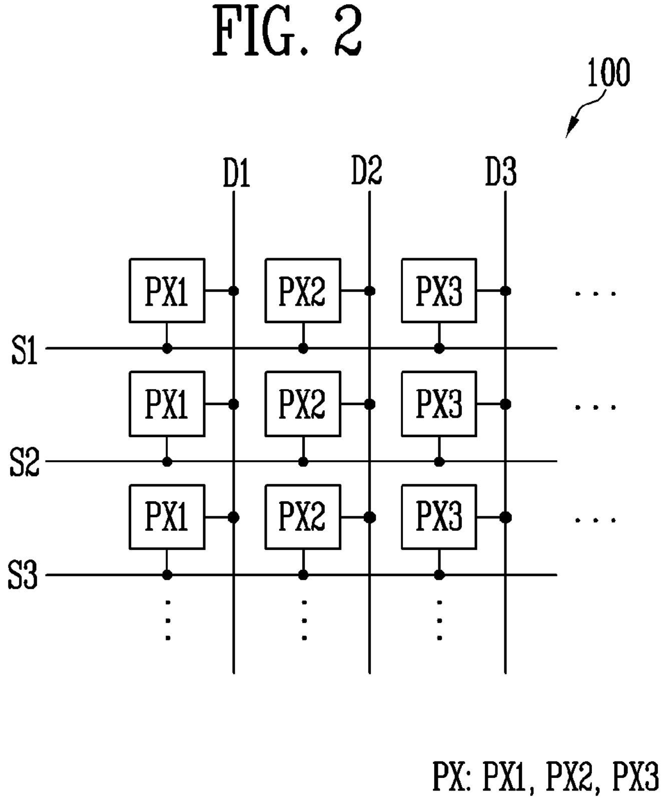
FIG. 2 is a diagram illustrating a display panel in accordance with an embodiment.

FIG. 2 is a diagram illustrating a display panel 100 in accordance with an embodiment.

Referring to FIG. 2, the display panel 100 may include a plurality of pixels PX, and scan lines S1, S2, and S3 and data lines D1, D2, and D3 that are connected to the pixels PX.

FIG. 2 illustrates a portion of the display panel 100. The first scan line S1 and the first data line D1 are not respectively limited to a first signal line of all of the scan lines and a first signal line of all of the data lines. For example, the first to third scan lines S1 to S3 may be understood as being scan lines corresponding to successive pixel rows. The first to third data lines D1 to D3 may be understood as being data lines corresponding to successive pixel columns.

The pixels PX may include first pixels PX1 (or first color pixels), second pixels PX2 (or second color pixels), and third pixels PX3 (or third color pixels). The first pixels PX1, the second pixels PX2, and the third pixels PX3 may respectively emit light of a first color, a second color, and a third color. In an embodiment, the first color, the second color, and the third color may be different colors, and each may be one of red, green, and blue. For example, in the first pixel row, which is controlled by the first scan line S1, the pixels PX may be arranged in a sequence of the first pixel PX1 configured to emit red light, the second pixel PX2 configured to emit green light, and the third pixel PX3 configured to emit blue light. The pixel arrangement of the first pixel row may repeat in the second pixel row, the third pixel row, and so on. For example, the first pixel column may include the first pixels PX1 configured to emit red light, the second pixel column may include the second pixels PX2 configured to emit green light, and the third pixel column may include the third pixels PX3 configured to emit blue light. However, this is only for illustrative purposes, and the arrangement of the pixels is not limited thereto.

Figure 3:
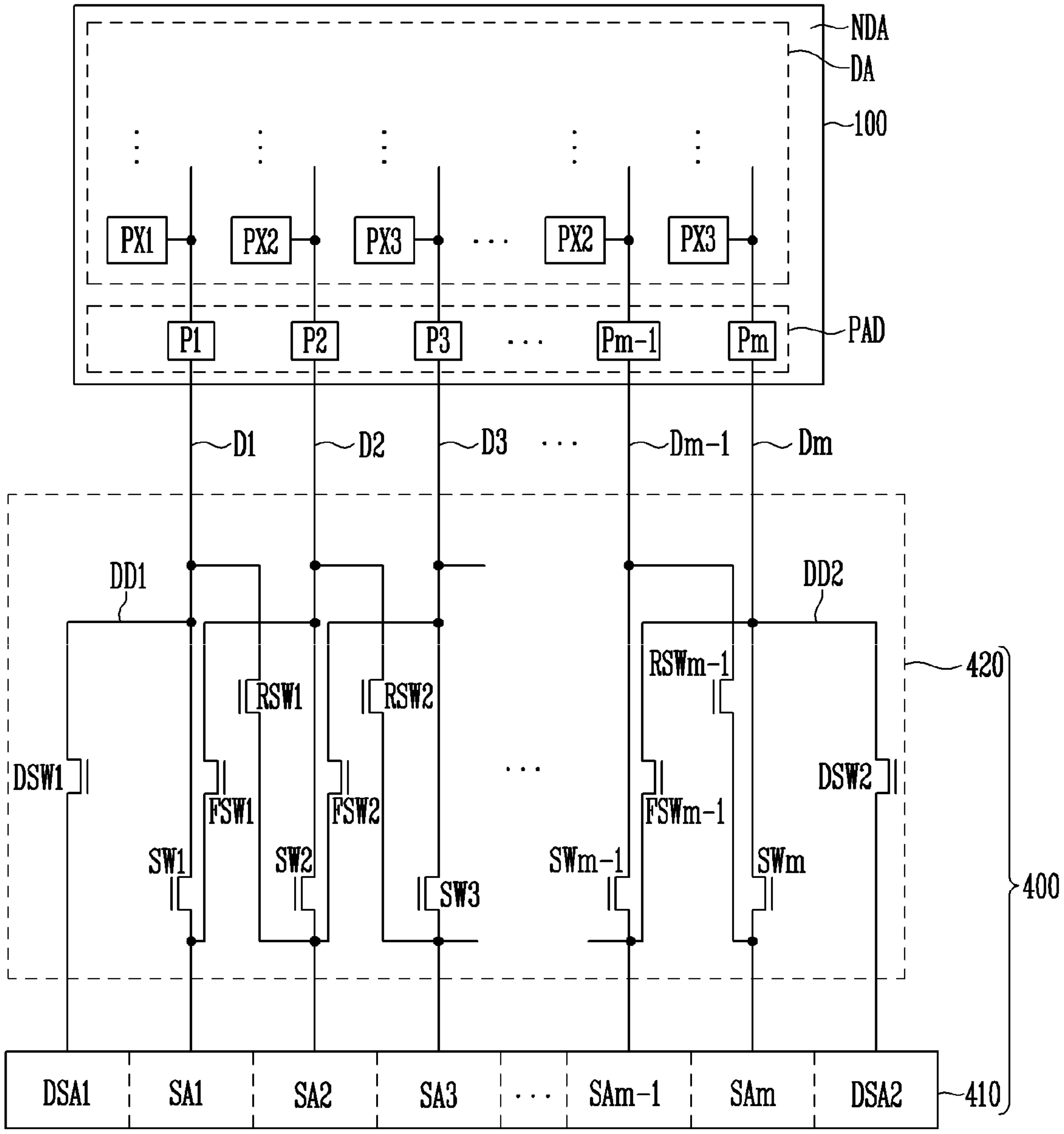
FIG. 3 is a diagram illustrating a display panel and a data driver in accordance with an embodiment.

FIG. 3 is a diagram illustrating the display panel 100 and the data driver 400 in accordance with an embodiment.

Referring to FIG. 3, the display panel 100 may include a display area DA and a non-display area NDA. The display area DA may be an area formed in which an image is displayed, and include pixels PX1, PX2, and PX3. The arrangement of the pixels PX1, PX2, and PX3 is assumed to be the same as that described in FIG. 2. The non-display area NDA may be an area in which an image is not displayed, and may enclose the display area DA. The non-display area NDA may include a pad component PAD. The pad component PAD may include pads P1 to Pm, where m is a positive integer. The pads P1 to Pm may provide, to the pixels PX1, PX2, and PX3, data signals transmitted from the data driver 400.

In an embodiment, the data driver 400 may include an output component 410 (also referred to as an output circuit) and a switching component 420 (also referred to as a switching circuit).

The output component 410 may transmit data signals to the data lines D1 to Dm. The output component 410 may include m source amplifiers SA1 to SAm that are respectively connected to the data lines D1 to Dm. The source amplifiers SA1 to SAm may output data signals to the data lines D1 to Dm connected thereto.

In an embodiment, the output component 410 may include dummy source amplifiers DSA1 and DSA2 that are respectively connected to the dummy data lines DD1 and DD2. The dummy source amplifiers DSA1 and DSA2 may compensate for a deficiency in data signals due to defects occurring in one or two source amplifiers among the source amplifiers SA1 to SAm. Therefore, the display panel 100 may be normally operated without the need to replace the data driver 400, which may reduce the production cost.

The first dummy source amplifier DSA1 may be adjacent to the first source amplifier SA1 configured to output a data signal to the first data line D1. In other words, the first dummy source amplifier DSA1 may be positioned at an outermost portion of the output component 410. The first dummy source amplifier DSA1 may be connected to the first dummy data line DD1, and may output a dummy data signal to the first dummy data line DD1.

The second dummy source amplifier DSA2 may be adjacent to the m-th source amplifier SAm configured to output a data signal to the m-th data line Dm. In other words, the second dummy source amplifier DSA2 may be positioned at an outermost portion of the output component 410. The second dummy source amplifier DSA2 may be positioned on an opposite side of the first dummy source amplifier DSA1. The second dummy source amplifier DSA2 may be connected to the second dummy data line DD2, and may output a dummy data signal to the second dummy data line DD2.

The switching component 420 may transmit data signals output from the output component 410 to the display panel 100. The switching component 420 may control (or select) the data lines D1 to Dm to which the data signals output from the output component 410 are to be transmitted.

Through the switching component 420, electrical defects in the data driver 400, e.g., defects in the source amplifiers SA1 to SAm to be described below, may be accurately detected.

In an embodiment, the switching component 420 may control transmission of data signals output from the source amplifiers SA1 to SAm to the data lines D1 to Dm that are respectively connected to the source amplifiers SA1 to SAm. For example, the switching component 420 may transmit a data signal output from a non-defective source amplifier to a data line connected to the non-defective source amplifier.

In an embodiment, the switching component 420 may control transmission of data signals output from the source amplifiers SA1 to SAm to data lines adjacent to the data lines D1 to Dm that are respectively connected to the source amplifiers SA1 to SAm. For example, when inspecting for electrical defects in the data driver 400, the switching component 420 may transmit a data signal output from a defective source amplifier to a data line adjacent to a data line connected to the defective source amplifier. Furthermore, when inspecting for electrical defects in the data driver 400, the switching component 420 may transmit a data signal output from a non-defective source amplifier to a data line adjacent to a data line connected to the non-defective source amplifier.

In an embodiment, the switching component 420 may control transmission of dummy data signals output from the dummy source amplifiers DSA1 and DSA2 to the data lines D1 and Dm. For example, the switching component 420 may transmit a dummy data signal output from the first dummy source amplifier DSA1 to the first data line D1. Furthermore, the switching component 420 may transmit a dummy data signal output from the second dummy source amplifier DSA2 to the m-th data line Dm.

In an embodiment, the switching component 420 may include m switches SW1 to SWm that are respectively formed on the data lines D1 to Dm. For example, the first switch SW1 may be formed on the first data line D1. The switches SW1 to SWm may control whether to supply data signals output from the source amplifiers SA1 to SAm to the data lines D1 to Dm. For example, the first switch SW1 may control whether to supply a data signal output from the first source amplifier SA1 to the first data line D1. If the first switch SW1 is turned on, the data signal output from the first source amplifier SA1 may be output to the first data line D1. On the other hand, if the first switch SW1 is turned off, the data signal output from the first source amplifier SA1 may not be supplied to the first data line D1.

In an embodiment, the switching component 420 may include m−1 forward switches FSW1 to FSWm−1 that are formed between the data lines D1 to Dm adjacent to each other. For example, the first forward switch FSW1 may be formed between the first data line D1 and the second data line D2 adjacent to the first data line D1. The forward switches FSW1 to FSWm−1 may control whether to supply data signals output from the source amplifiers SA1 to SAm−1 to the adjacent data lines D2 to Dm. For example, the first forward switch FSW1 may control whether to supply a data signal output from the first source amplifier SA1 to the second data line D2. If the first forward switch FSW1 is turned on, the data signal output from the first source amplifier SA1 may be supplied to the second data line D2. On the other hand, if the first forward switch FSW1 is turned off, the data signal output from the first source amplifier SA1 may not be supplied to the second data line D2.

In an embodiment, the switching component 420 may include m−1 reverse switches RSW1 to RSWm−1 that are formed between the data lines D1 to Dm adjacent to each other. For example, the first reverse switch RSW1 may be formed between the first data line D1 and the second data line D2 adjacent to the first data line D1. The reverse switches RSW1 to RSWm−1 may control whether to supply data signals output from the source amplifiers SA2 to SAm to the adjacent data lines D1 to Dm−1. For example, the first reverse switch RSW1 may control whether to supply a data signal output from the second source amplifier SA2 to the first data line D1. If the first reverse switch RSW1 is turned on, the data signal output from the second source amplifier SA2 may be output to the first data line D1. On the other hand, if the first reverse switch RSW1 is turned off, the data signal output from the second source amplifier SA2 may not be supplied to the first data line D1. As such, the reverse switches RSW1 to RSWm−1 may supply data signals in a direction opposite to that of the forward switches FSW1 to FSWm−1.

In an embodiment, the switching component 420 may include dummy switches DSW1 and DSW2 that are respectively formed on the dummy data lines DD1 and DD2.

The first dummy switch DSW1 may be formed on the first dummy data line DD1. The first dummy switch DSW1 may control whether to supply a dummy data signal output from the first dummy source amplifier DSA1 to the first data line D1. If the first dummy switch DSW1 is turned on, the dummy data signal output from the first dummy source amplifier DSA1 may be supplied to the first data line D1 via the first dummy data line DD1. On the other hand, if the first dummy switch DSW1 is turned off, the dummy data signal output from the first dummy source amplifier DSA1 may not be supplied to the first data line D1.

The second dummy switch DSW2 may be formed on the first dummy data line DD2. The second dummy switch DSW2 may control whether to supply a dummy data signal output from the second dummy source amplifier DSA2 to the m-th data line Dm. If the second dummy switch DSW2 is turned on, the dummy data signal output from the second dummy source amplifier DSA2 may be supplied to the m-th data line Dm via the second dummy data line DD2. On the other hand, if the second dummy switch DSW2 is turned off, the dummy data signal output from the second dummy source amplifier DSA2 may not be supplied to the m-th data line Dm.

FIGS. 4 to 12 are diagrams for schematically describing a method of inspecting for a defect in a single source amplifier. For convenience of explanation, it is assumed that in FIGS. 4 to 12, m is 3 (refer to FIG. 3).

FIGS. 4 to 9 schematically illustrate a method of inspecting the source amplifier for a defect in a case in which the defect occurs in a source amplifier connected to any one data line other than the m-th data line Dm (refer to FIG. 3).

Figure 4:
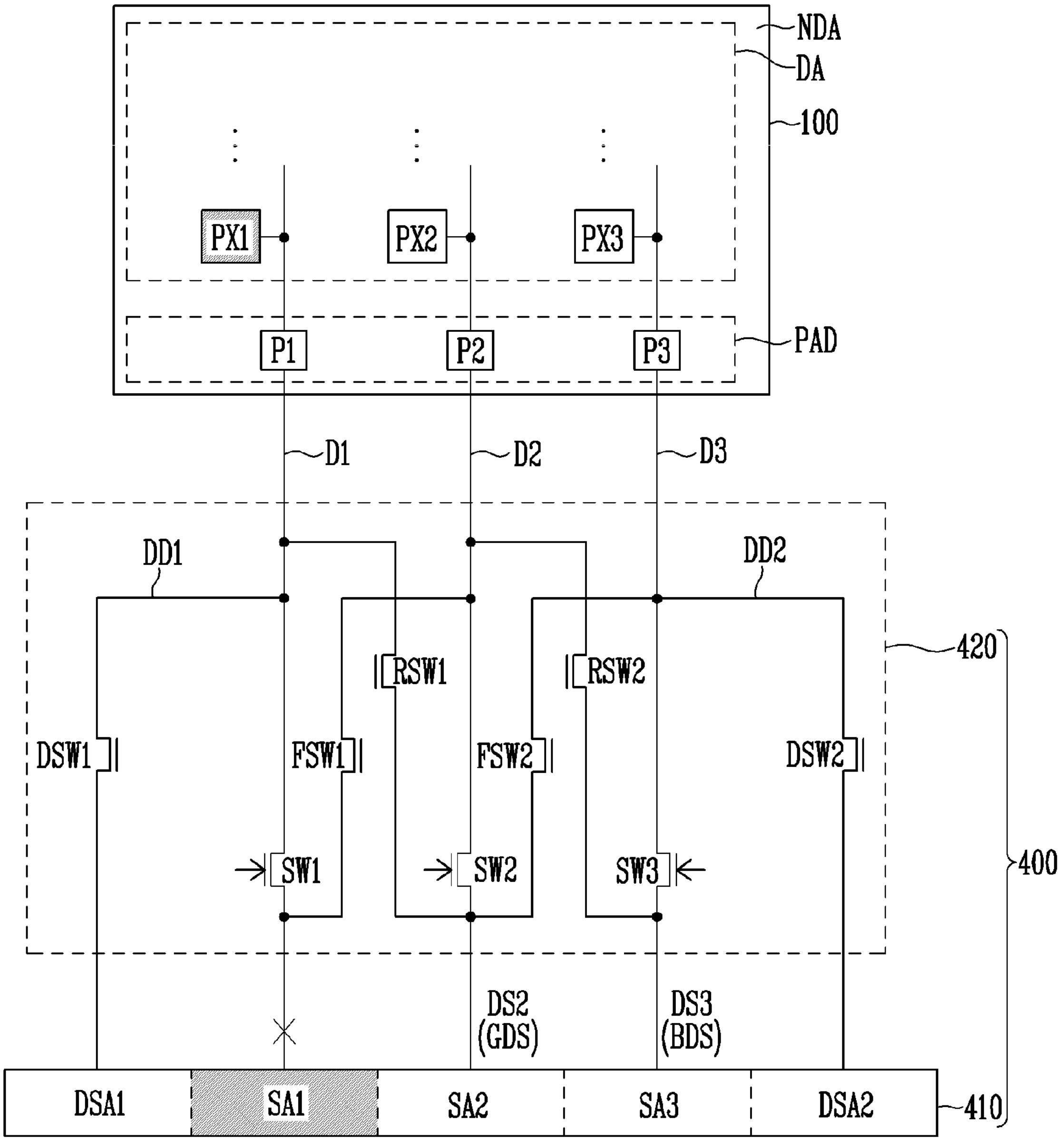
FIGS. 4 to 12 are diagrams for schematically describing a method of inspecting for a defect in a single source amplifier.

Referring to FIG. 4, the switches SW1, SW2, and SW3 may be turned on to supply data signals to the data lines D1, D2, and D3. The forward switches FSW1 and FSW2, the reverse switches RSW1 and RSW2, and the dummy switches DSW1 and DSW2 may be turned off. For example, the second switch SW2 is turned on, so that a second data signal DS2 output from the second source amplifier SA2 is supplied to the second data line D2. The second data signal DS2 may be a green data signal GDS that is supplied to the second pixels PX2 connected to the second data line D2. Furthermore, the third switch SW3 is turned on, so that a third data signal DS3 output from the third source amplifier SA3 is supplied to the third data line D3. The third data signal DS3 may be a blue data signal BDS that is supplied to the third pixels PX3 connected to the third data line D3.

As a result, the second pixels PX2 connected to the second data line D2 and the third pixels PX3 connected to the third data line D3 may normally emit light. In contrast, even if the first switch SW1 is turned on, the first pixels PX1 connected to the first data line D1 may not normally emit light. However, at this point it is unclear whether the aforementioned abnormal operation results from a defect in the first source amplifier SA1 or other defects such as, for example, bonding defects in the data driver 400 and the flexible circuit board.

Figure 5:
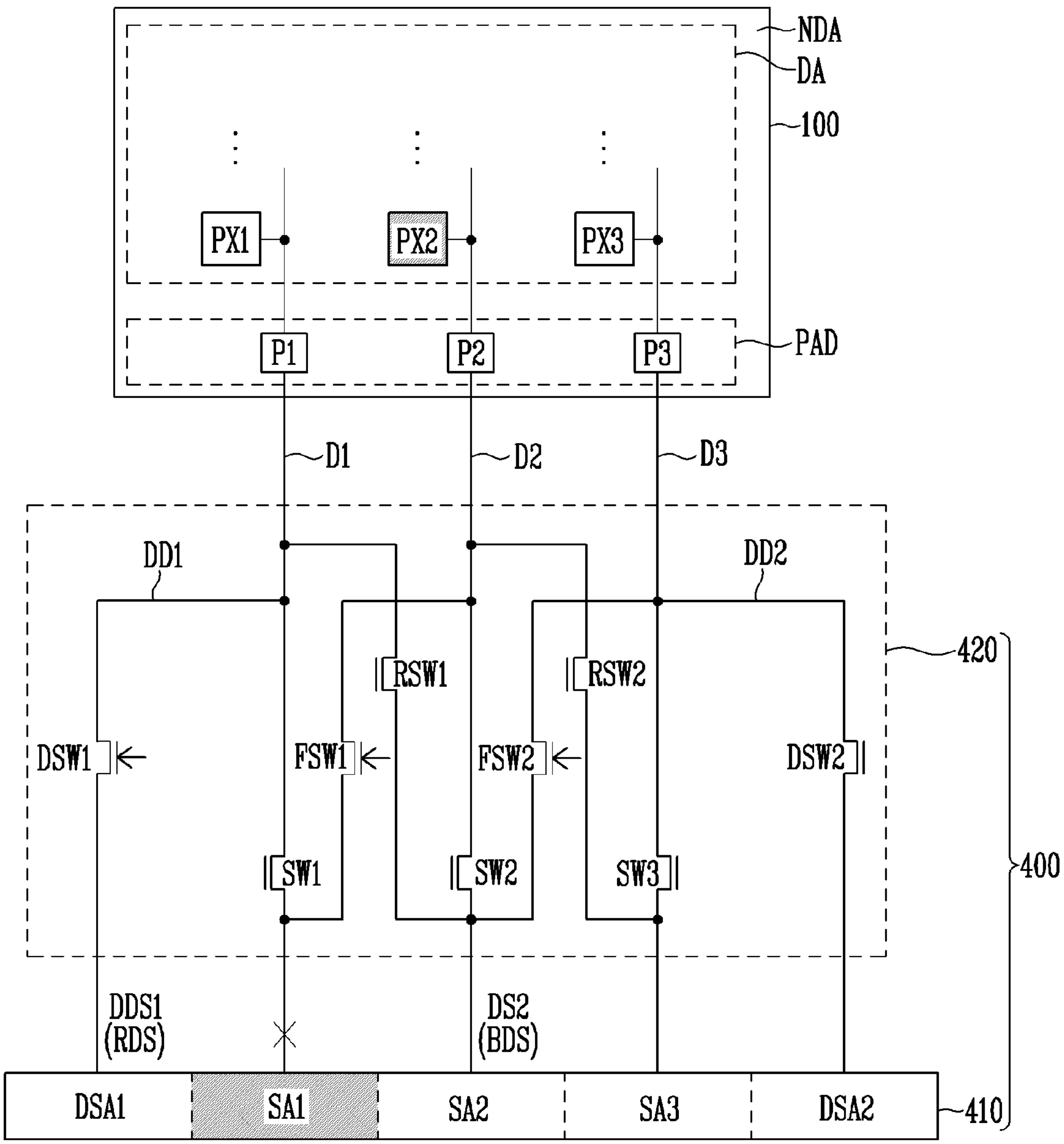

Referring to FIG. 5, the forward switches FSW1 and FSW2 and the first dummy switch DSW1 may be turned on to supply data signals to the data lines D1, D2, and D3. The switches SW1, SW2, and SW3, the reverse switches RSW1 and RSW2, and the second dummy switch DSW2 may be turned off. For example, the first dummy switch DSW1 is turned on, so that a first dummy data signal DDS1 output from the first dummy source amplifier DSA1 is supplied to the first data line D1 via the first dummy data line DD1. The first dummy data signal DDS1 may be a red data signal RDS that is supplied to the first pixels PX1 connected to the first data line D1. Furthermore, the second forward switch FSW2 is turned on, so that a second data signal DS2 output from the second source amplifier SA2 is supplied to the third data line D3. The second data signal DS2 may be changed to a blue data signal BDS that is supplied to the third pixels PX3 connected to the third data line D3. Here, even when the first forward switch FSW1 is turned on, a data signal may not be supplied to the second data line D2 due to a defect in the first source amplifier SA1.

As a result, the second pixels PX2 connected to the second data line D2 may not normally emit light, while the first pixels PX1 connected to the first data line D1 and the third pixels PX3 connected to the third data line D3 may normally emit light. Here, since the first pixels PX1 connected to the first data line D1 normally emit light, it can be determined that there are no other defects such as, for example, bonding defects of the data driver 400 and the flexible circuit board. Furthermore, although the second pixels PX2 connected to the second data line D2 have normally emitted light at a preceding stage (refer to FIG. 4), the second pixels PX2 do not normally emit light due to the turning on of the first forward switch FSW1 and the turning off of the second switch SW2. Consequently, it can be determined that a defect has occurred in the first source amplifier SA1.

Figure 6:
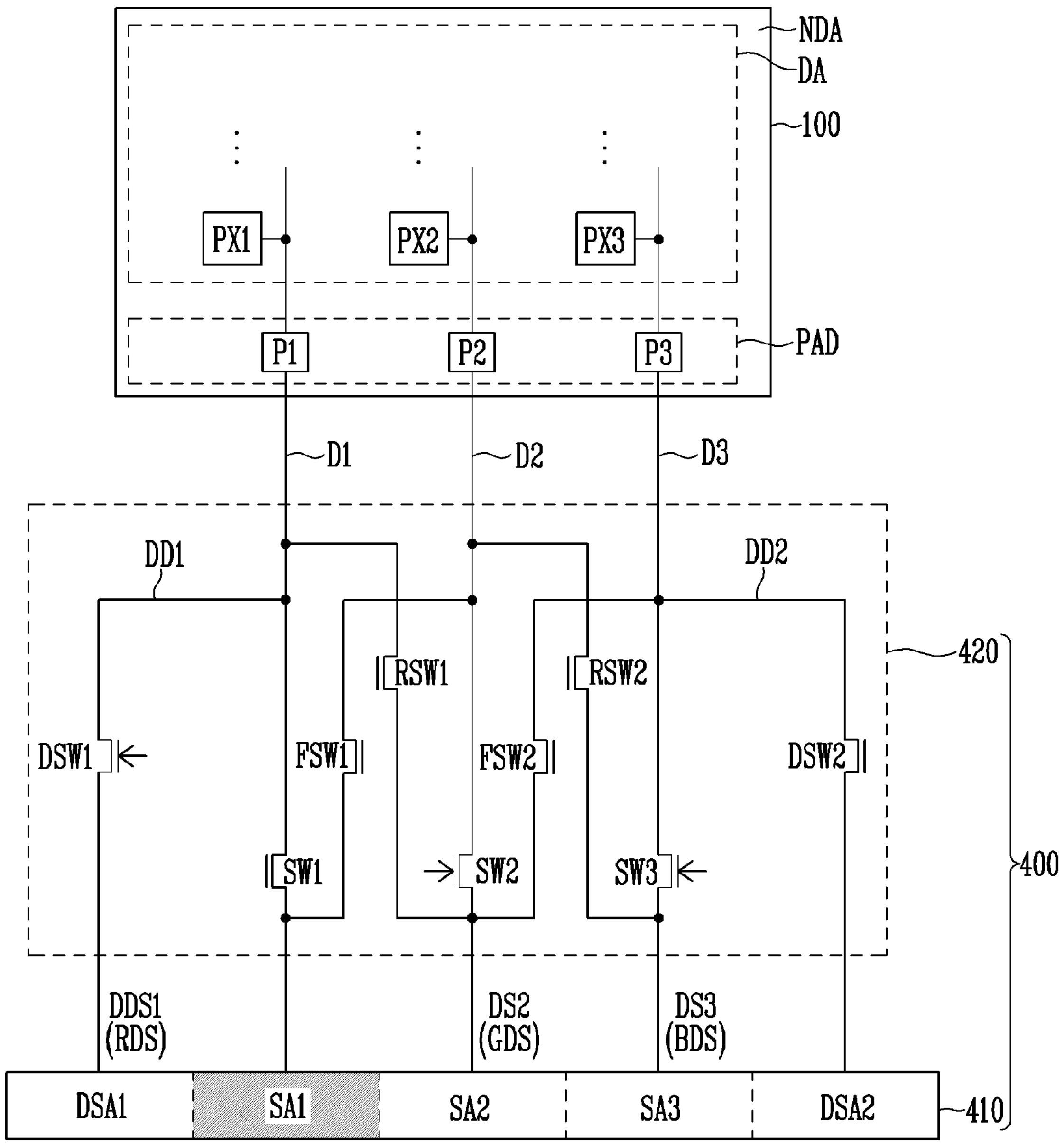

Referring to FIG. 6, the first dummy switch DSW1 and the switches SW2 and SW3 may be turned on to supply data signals to the data lines D1, D2, and D3. The first switch SW1, the forward switches FSW1 and FSW2, the reverse switches RSW1 and RSW2, and the second dummy switch DSW2 may be turned off. For example, the first dummy switch DSW1 is turned on, so that a first dummy data signal DDS1 output from the first dummy source amplifier DSA1 is supplied to the first data line D1 via the first dummy data line DD1. Furthermore, the second switch SW2 is turned on, so that a second data signal DS2 output from the second source amplifier SA2 is supplied to the second data line D2. The second data signal DS2 may be changed to a green data signal GD2 that is supplied to the second pixels PX2 connected to the second data line D2. Furthermore, the third switch SW3 is turned on, so that a third data signal DS3 output from the third source amplifier SA3 is supplied to the third data line D3.

As a result, the first pixels PX1 connected to the first data line D1, the second pixels PX2 connected to the second data line D2, and the third pixels PX3 connected to the third data line D3 all emit light normally. In other words, even if a defect occurs in one source amplifier SA1, the display panel 100 may be normally driven without the need for module replacement.

Figure 7:
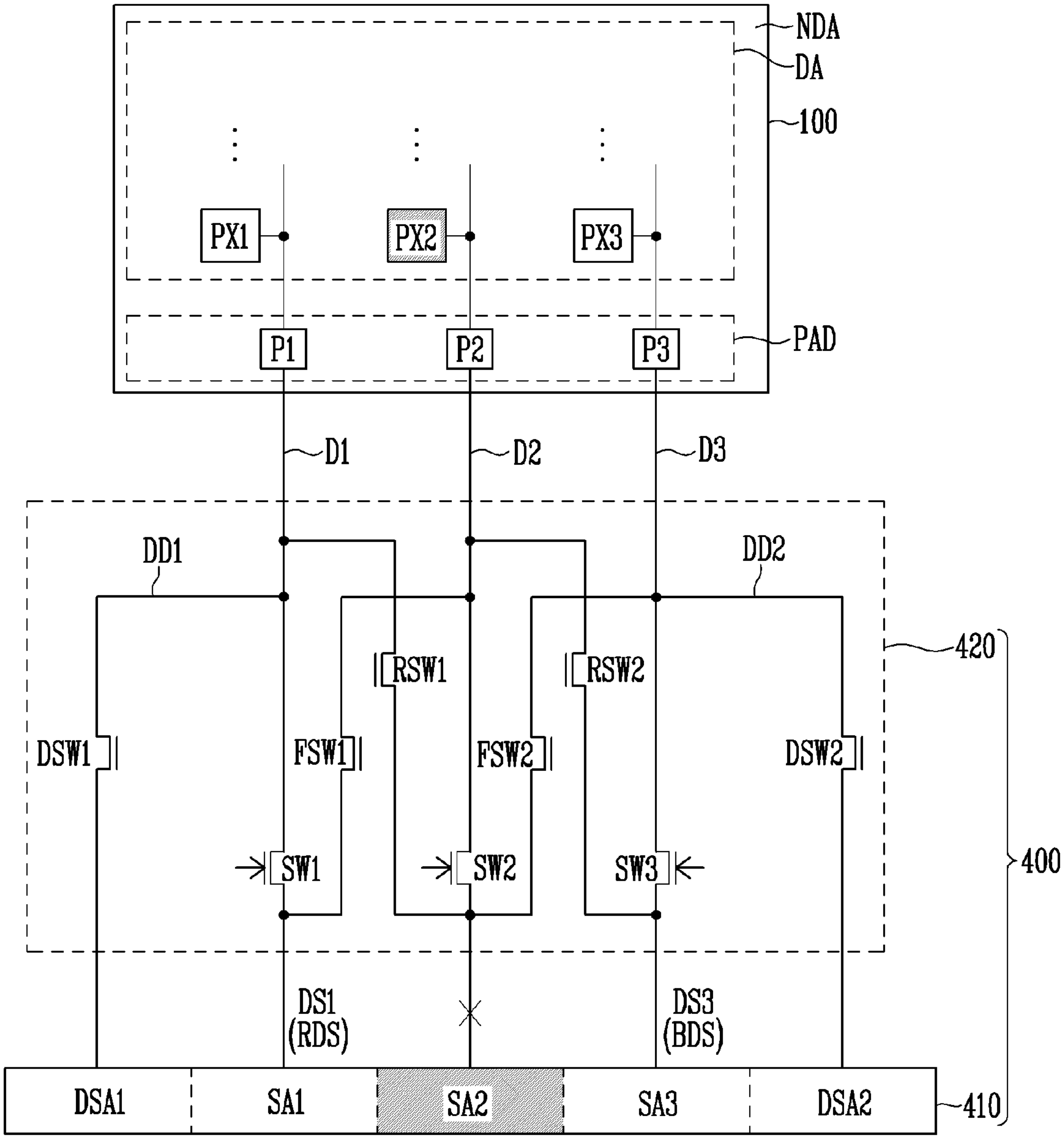

Referring to FIG. 7, the switches SW1, SW2, and SW3 may be turned on to supply data signals to the data lines D1, D2, and D3. The forward switches FSW1 and FSW2, the reverse switches RSW1 and RSW2, and the dummy switches DSW1 and DSW2 may be turned off. For example, the first switch SW1 is turned on, so that a first data signal DS1 output from the first source amplifier SA1 is supplied to the first data line D1. The first data signal DS1 may be a red data signal RDS that is supplied to the first pixels PX1 connected to the first data line D1. Furthermore, the third switch SW3 is turned on, so that a third data signal DS3 output from the third source amplifier SA3 is supplied to the third data line D3. The third data signal DS3 may be a blue data signal BDS that is supplied to the third pixels PX3 connected to the third data line D3.

As a result, the first pixels PX1 connected to the first data line D1, and the third pixels PX3 connected to the third data line D3 may normally emit light. In contrast, even if the second switch SW2 is turned on, the second pixels PX2 connected to the second data line D2 may not normally emit light. However, at this point it is unclear whether the aforementioned abnormal operation results from a defect in the second source amplifier SA2 or other defects such as, for example, bonding defects in the data driver 400 and the flexible circuit board.

Figure 8:
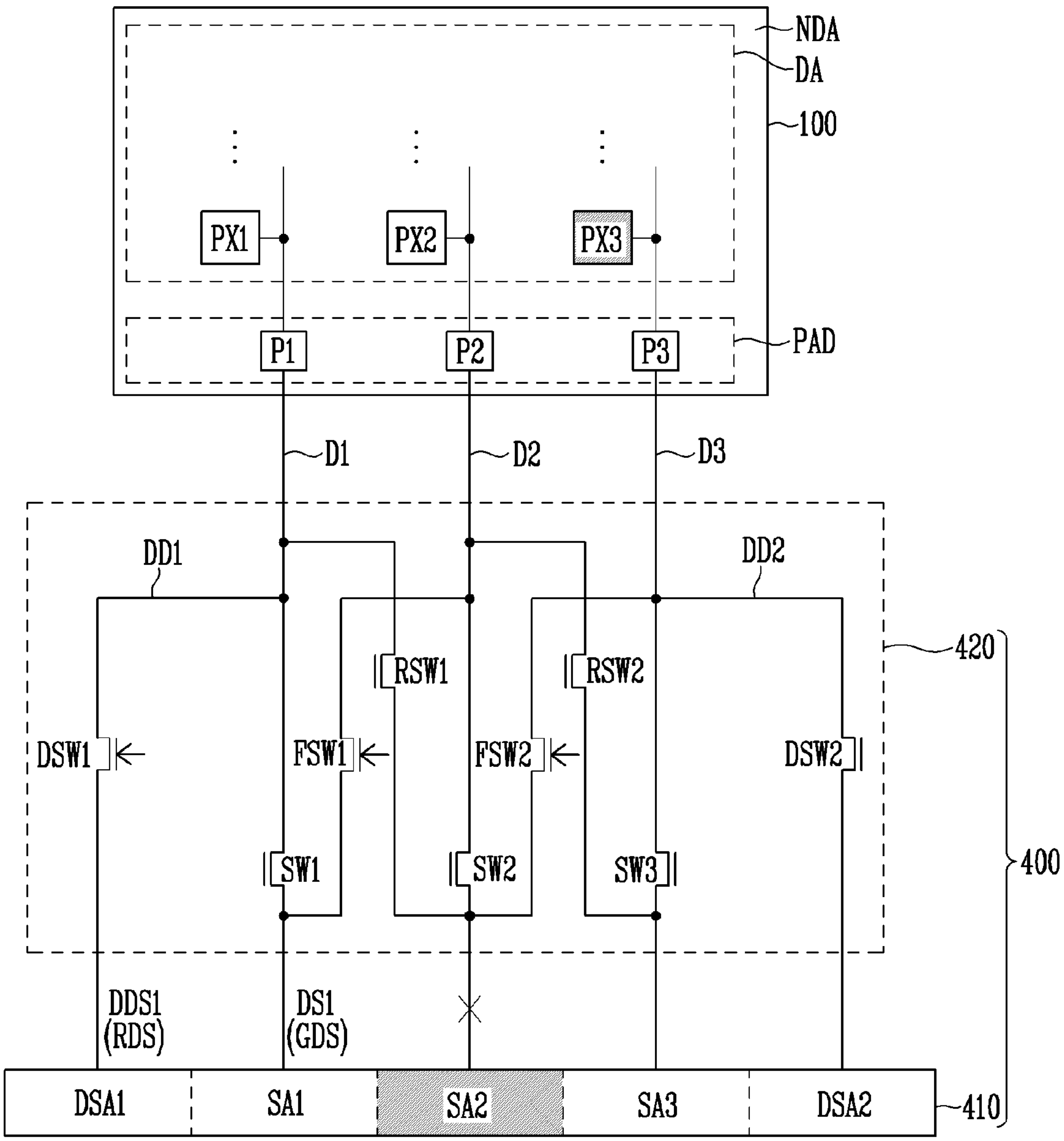

Referring to FIG. 8, the forward switches FSW1 and FSW2 and the first dummy switch DSW1 may be turned on to supply data signals to the data lines D1, D2, and D3. The switches SW1, SW2, and SW3, the reverse switches RSW1 and RSW2, and the second dummy switch DSW2 may be turned off. For example, the first dummy switch DSW1 is turned on, so that a first dummy data signal DDS1 output from the first dummy source amplifier DSA1 is supplied to the first data line D1 via the first dummy data line DD1. The first dummy data signal DDS1 may be a red data signal RDS that is supplied to the first pixels PX1 connected to the first data line D1. Furthermore, the first forward switch FSW1 is turned on, so that a first data signal DS1 output from the first source amplifier SA1 is supplied to the second data line D2. The first data signal DS1 may be changed to a green data signal GD2 that is supplied to the second pixels PX2 connected to the second data line D2. Here, even when the second forward switch FSW2 is turned on, a data signal may not be supplied to the third data line D3 due to a defect in the second source amplifier SA2.

As a result, the third pixels PX3 connected to the third data line D3 may not normally emit light, while the first pixels PX1 connected to the first data line D1 and the second pixels PX2 connected to the second data line D2 may normally emit light. Here, since the second pixels PX2 connected to the second data line D2 normally emit light, it can be determined that there are no other defects such as, for example, bonding defects of the data driver 400 and the flexible circuit board. Furthermore, although the third pixels PX3 connected to the third data line D3 have normally emitted light at a preceding stage (refer to FIG. 7), the third pixels PX3 do not normally emit light due to the turning on of the second forward switch FSW2 and the turning off of the third switch SW3. Therefore, it can be determined that a defect has occurred in the second source amplifier SA2.

Figure 9:
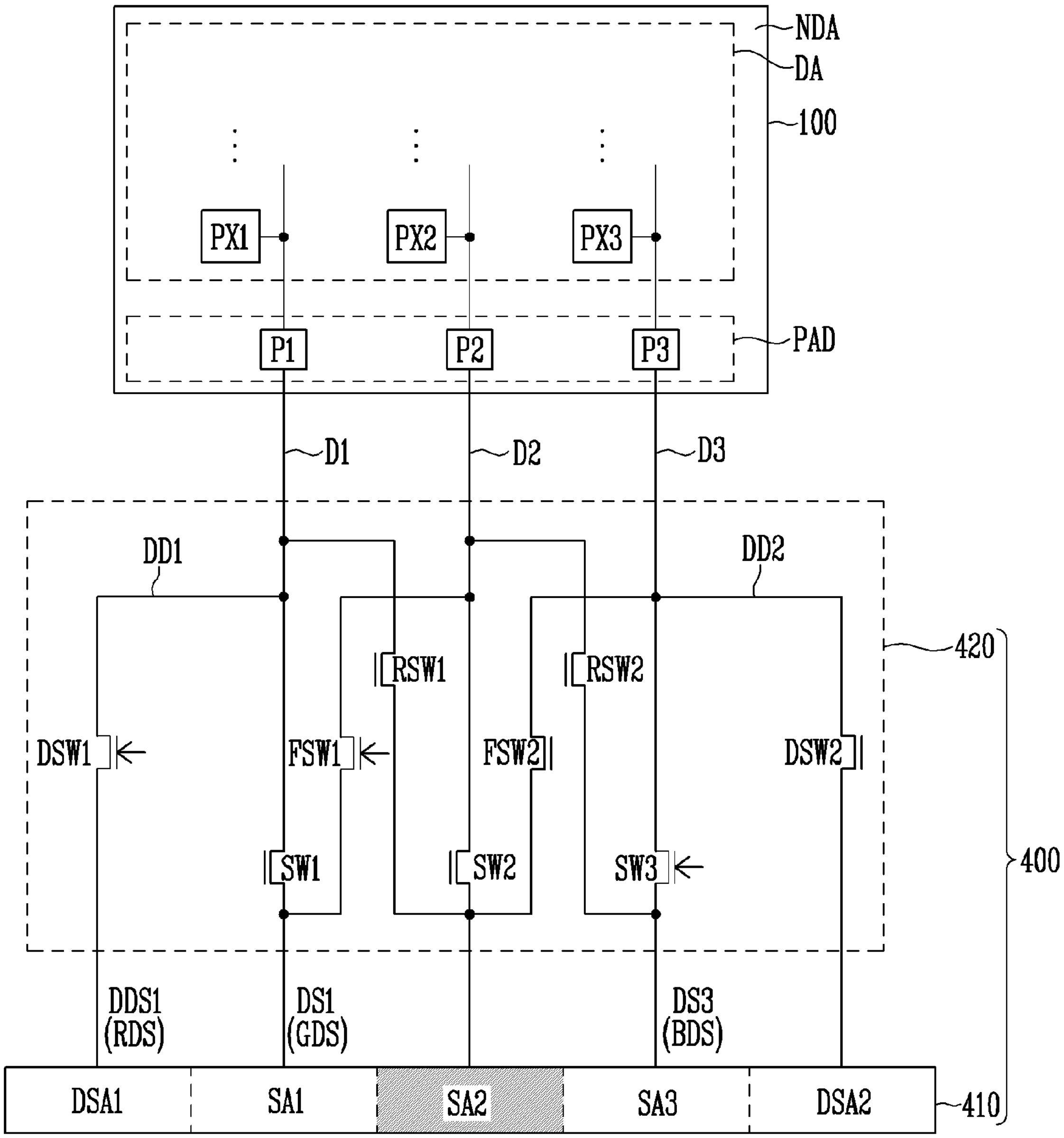

Referring to FIG. 9, the first dummy switch DSW1, the forward switch FSW1, and the third switch SW3 may be turned on to supply data signals to the data lines D1, D2, and D3. The first switch SW1, the second switch SW2, the second forward switch FSW2, the reverse switches RSW1 and RSW2, and the second dummy switch DSW2 may be turned off. For example, the first dummy switch DSW1 is turned on, so that a first dummy data signal DDS1 output from the first dummy source amplifier DSA1 is supplied to the first data line D1 via the first dummy data line DD1. Furthermore, the first forward switch FSW1 is turned on, so that a first data signal DS1 output from the first source amplifier SA1 is supplied to the second data line D2. Furthermore, the third switch SW3 is turned on, so that a third data signal DS3 output from the third source amplifier SA3 is supplied to the third data line D3.

As a result, the first pixels PX1 connected to the first data line D1, the second pixels PX2 connected to the second data line D2, and the third pixels PX3 connected to the third data line D3 all emit light normally. In other words, even if a defect occurs in one source amplifier SA2, the display panel 100 may be normally driven without the need for module replacement.

Figure 10:
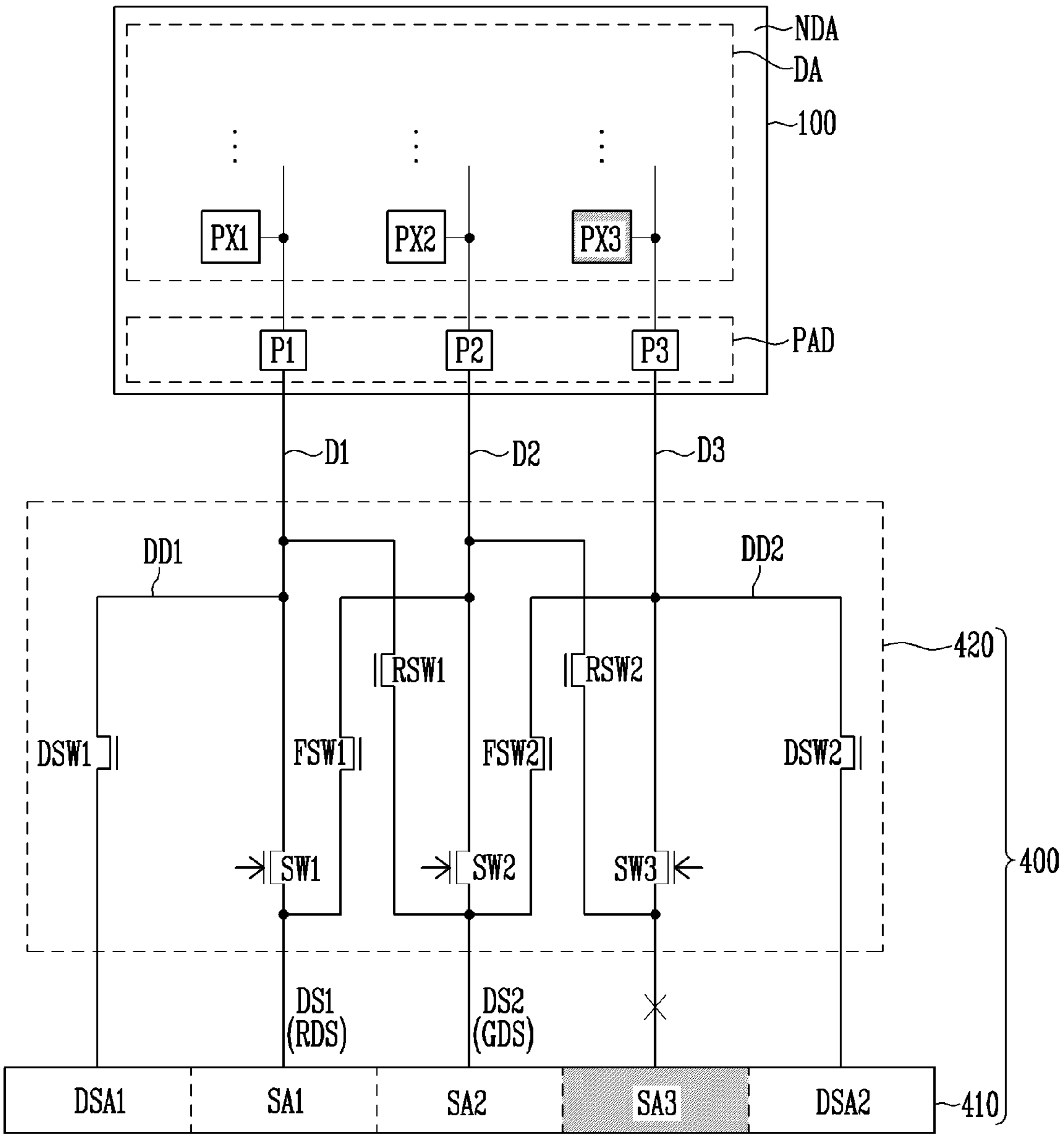
Figure 11:
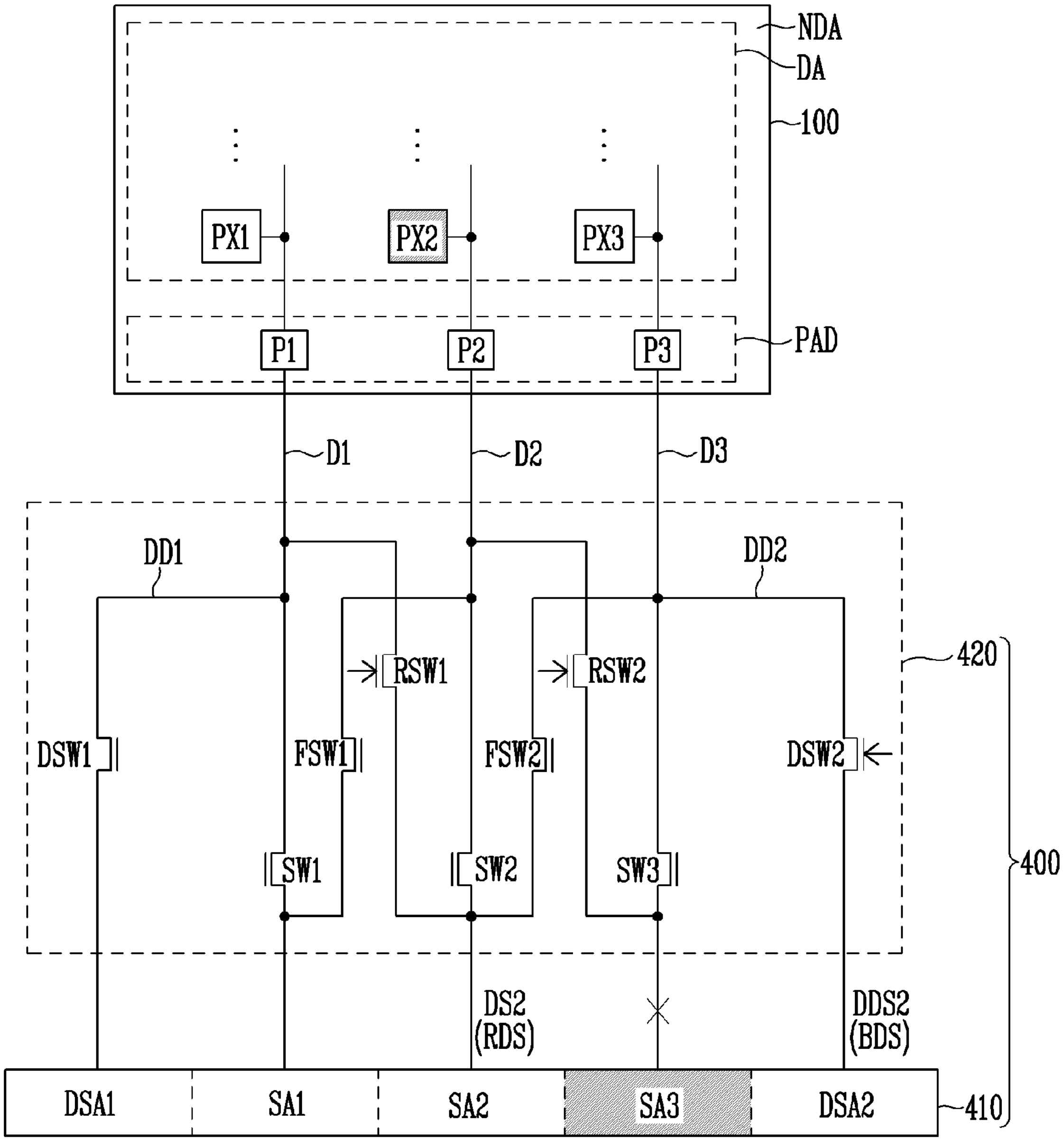
Figure 12:
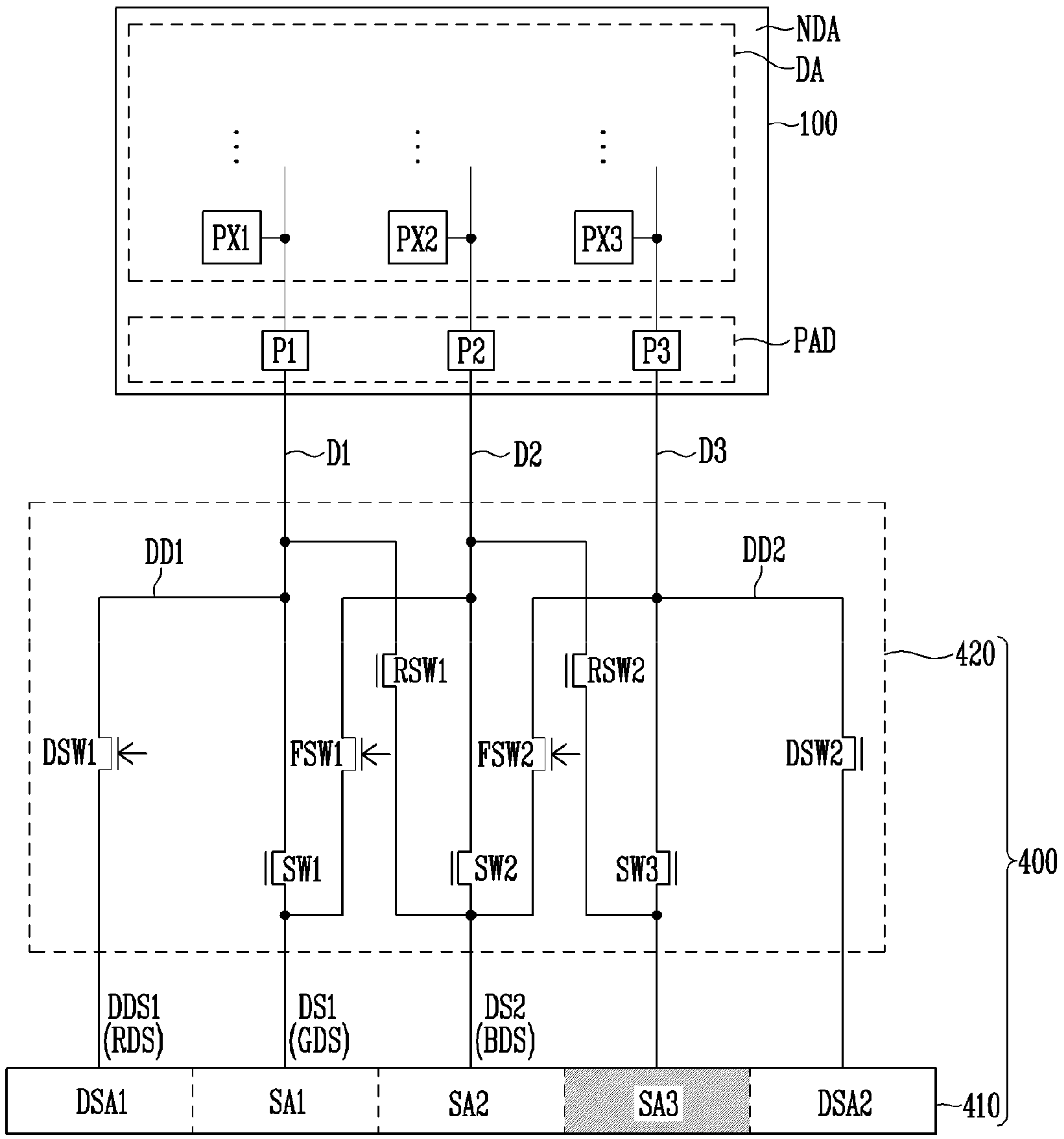

FIGS. 10 to 12 schematically illustrate a method of inspecting the source amplifier for a defect in a case in which the defect occurs in the source amplifier connected to the m-th data line Dm (refer to FIG. 3).

Referring to FIG. 10, the switches SW1, SW2, and SW3 may be turned on to supply data signals to the data lines D1, D2, and D3. The forward switches FSW1 and FSW2, the reverse switches RSW1 and RSW2, and the dummy switches DSW1 and DSW2 may be turned off. For example, the first switch SW1 is turned on, so that a first data signal DS1 output from the first source amplifier SA1 is supplied to the first data line D1. The first data signal DS1 may be a red data signal RDS that is supplied to the first pixels PX1 connected to the first data line D1. Furthermore, the second switch SW2 is turned on, so that a second data signal DS2 output from the second source amplifier SA2 is supplied to the second data line D2. The second data signal DS2 may be a green data signal GD2 that is supplied to the second pixels PX2 connected to the second data line D2.

As a result, the first pixels PX1 connected to the first data line D1, and the second pixels PX2 connected to the second data line D2 may normally emit light. In contrast, even if the third switch SW3 is turned on, the third pixels PX3 connected to the third data line D3 may not normally emit light. However, at this point it is unclear whether the aforementioned abnormal operation results from a defect in the third source amplifier SA3 or other defects such as, for example, bonding defects in the data driver 400 and the flexible circuit board.

Referring to FIG. 11, the reverse switches RSW1 and RSW2 and the second dummy switch DSW2 may be turned on to supply data signals to the data lines D1, D2, and D3. The switches SW1, SW2, and SW3, the forward switches FSW1 and FSW2, and the first dummy switch DSW1 may be turned off. For example, the first reverse switch RSW1 is turned on, so that a second data signal DS2 output from the second source amplifier SA2 is supplied to the first data line D1. The second data signal DS2 may be changed to a red data signal RDS that is supplied to the first pixels PX1 connected to the first data line D1. Furthermore, the second dummy switch DSW2 is turned on, so that a second dummy data signal DDS2 output from the second dummy source amplifier DSA2 is supplied to the third data line D3 via the second dummy data line DD2. The second dummy data signal DDS2 may be a blue data signal BDS that is supplied to the third pixels PX3 connected to the third data line D3. Here, even when the second reverse switch RSW2 is turned on, a data signal may not be supplied to the second data line D2 due to a defect in the third source amplifier SA3.

As a result, the second pixels PX2 connected to the second data line D2 may not normally emit light, while the first pixels PX1 connected to the first data line D1 and the third pixels PX3 connected to the third data line D3 may normally emit light. Here, since the third pixels PX3 connected to the third data line D3 normally emit light, it can be determined that there are no other defects such as, for example, bonding defects of the data driver 400 and the flexible circuit board. Furthermore, although the second pixels PX2 connected to the second data line D2 have normally emitted light at a preceding stage (refer to FIG. 10), the second pixels PX2 do not normally emit light due to the turning on of the second reverse switch RSW2 and the turning off of the second switch SW2. Therefore, it can be determined that a defect has occurred in the third source amplifier SA3.

Referring to FIG. 12, the first dummy switch DSW1 and the forward switches FSW1 and FSW2 may be turned on to supply data signals to the data lines D1, D2, and D3. The switches SW1, SW2, and SW3, the reverse switches RSW1 and RSW2, and the second dummy switch DSW2 may be turned off. For example, the first dummy switch DSW1 is turned on, so that a first dummy data signal DDS1 output from the first dummy source amplifier DSA1 is supplied to the first data line D1 via the first dummy data line DD1. Furthermore, the first forward switch FSW1 is turned on, so that a first data signal DS1 output from the first source amplifier SA1 is supplied to the second data line D2. The first data signal DS1 may be changed to a green data signal GD2 that is supplied to the second pixels PX2 connected to the second data line D2. Furthermore, the second forward switch FSW2 is turned on so that a second data signal DS2 output from the second source amplifier SA2 can be supplied to the third data line D3. The second data signal DS2 may be changed to a blue data signal BDS that is supplied to the third pixels PX3 connected to the third data line D3.

As a result, the first pixels PX1 connected to the first data line D1, the second pixels PX2 connected to the second data line D2, and the third pixels PX3 connected to the third data line D3 all emit light normally. In other words, even if a defect occurs in one source amplifier SA3, the display panel 100 may be normally driven without the need for module replacement.

FIGS. 13 to 24 are diagrams for schematically describing a method of inspecting for defects in two source amplifiers. For convenience of explanation, it is assumed that in FIGS. 13 to 24, m is 4 (refer to FIG. 3).

Figure 13:
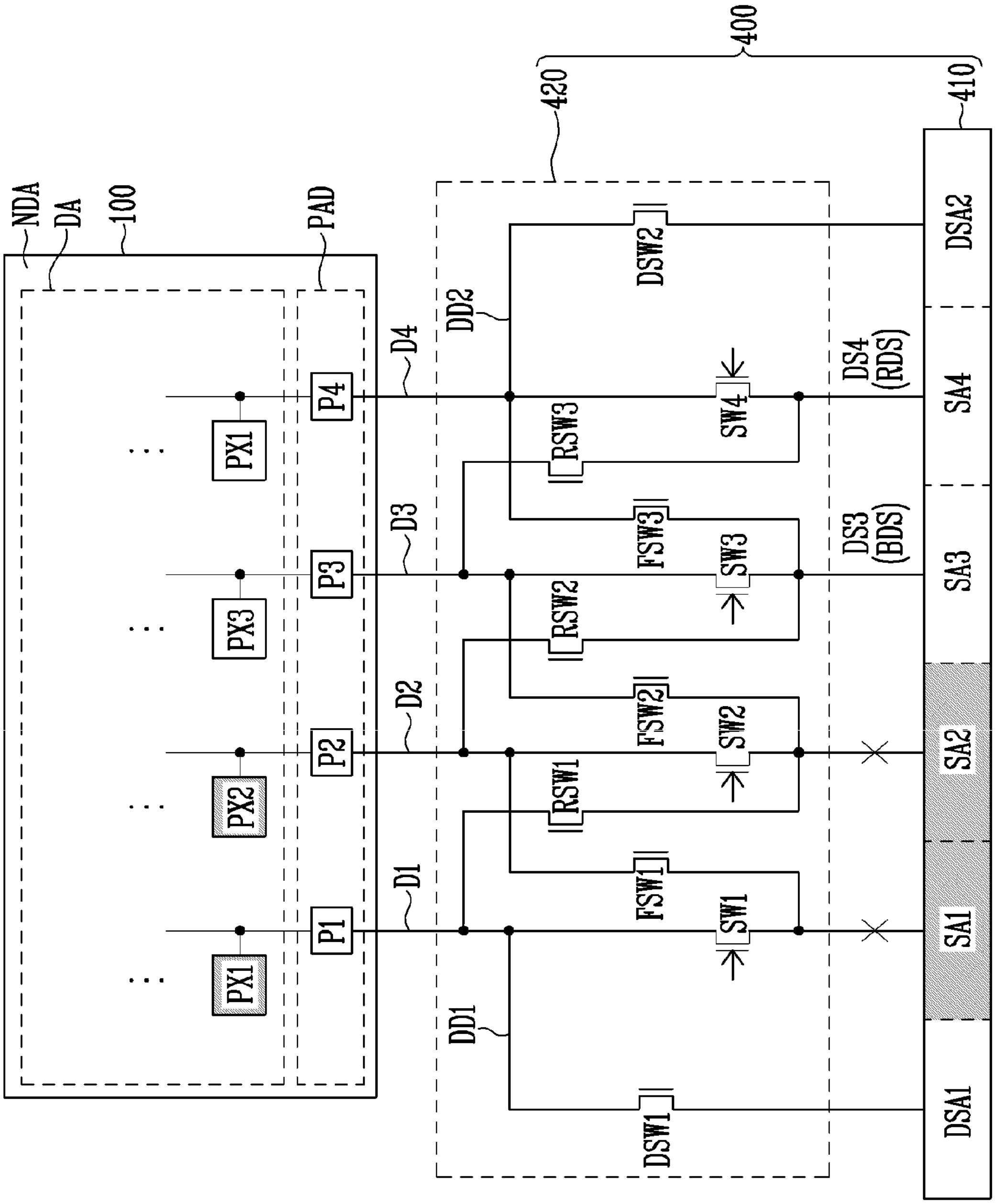
FIGS. 13 to 24 are diagrams for schematically describing a method of inspecting for defects in two source amplifiers.
Figure 14:
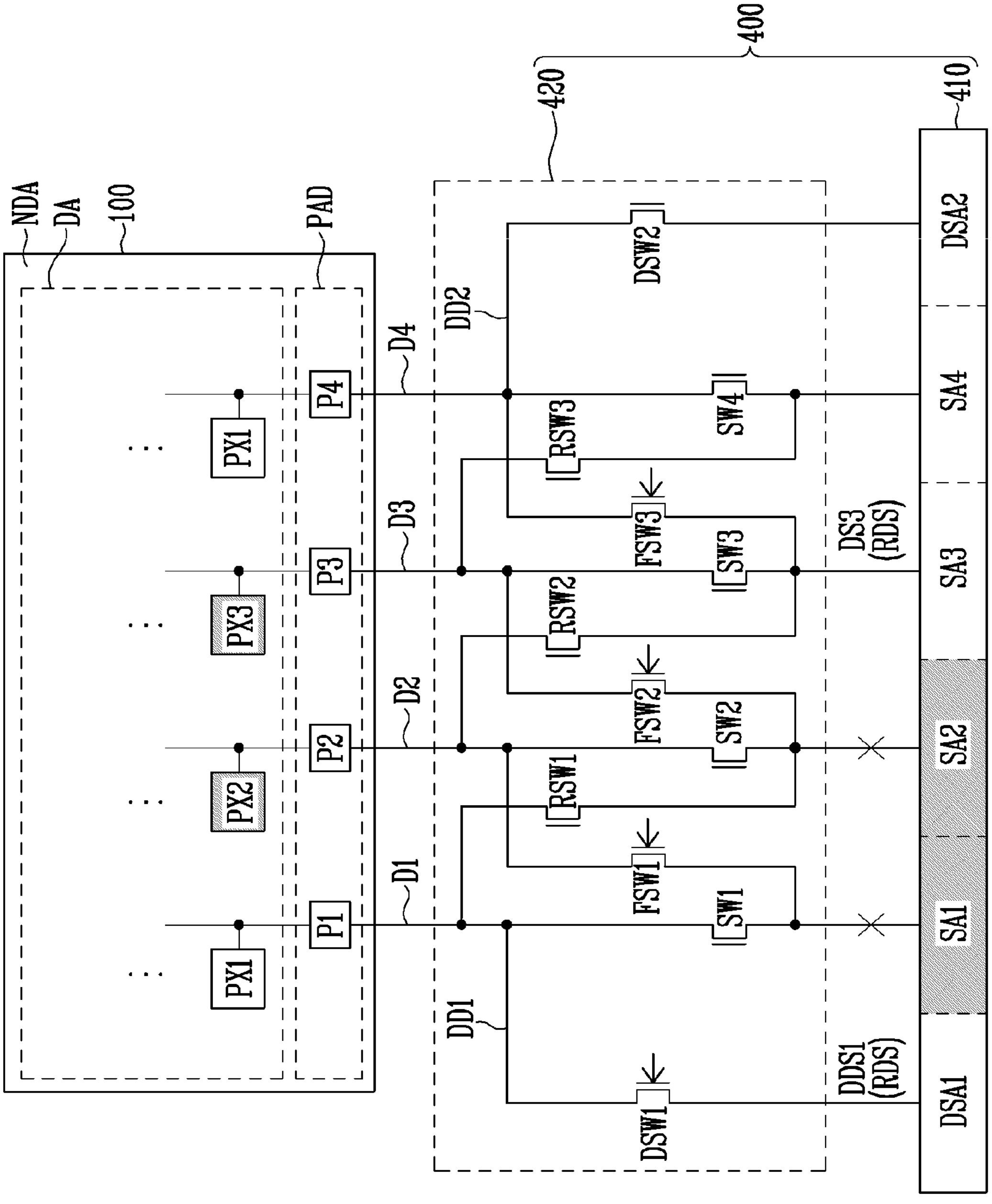
Figure 15:
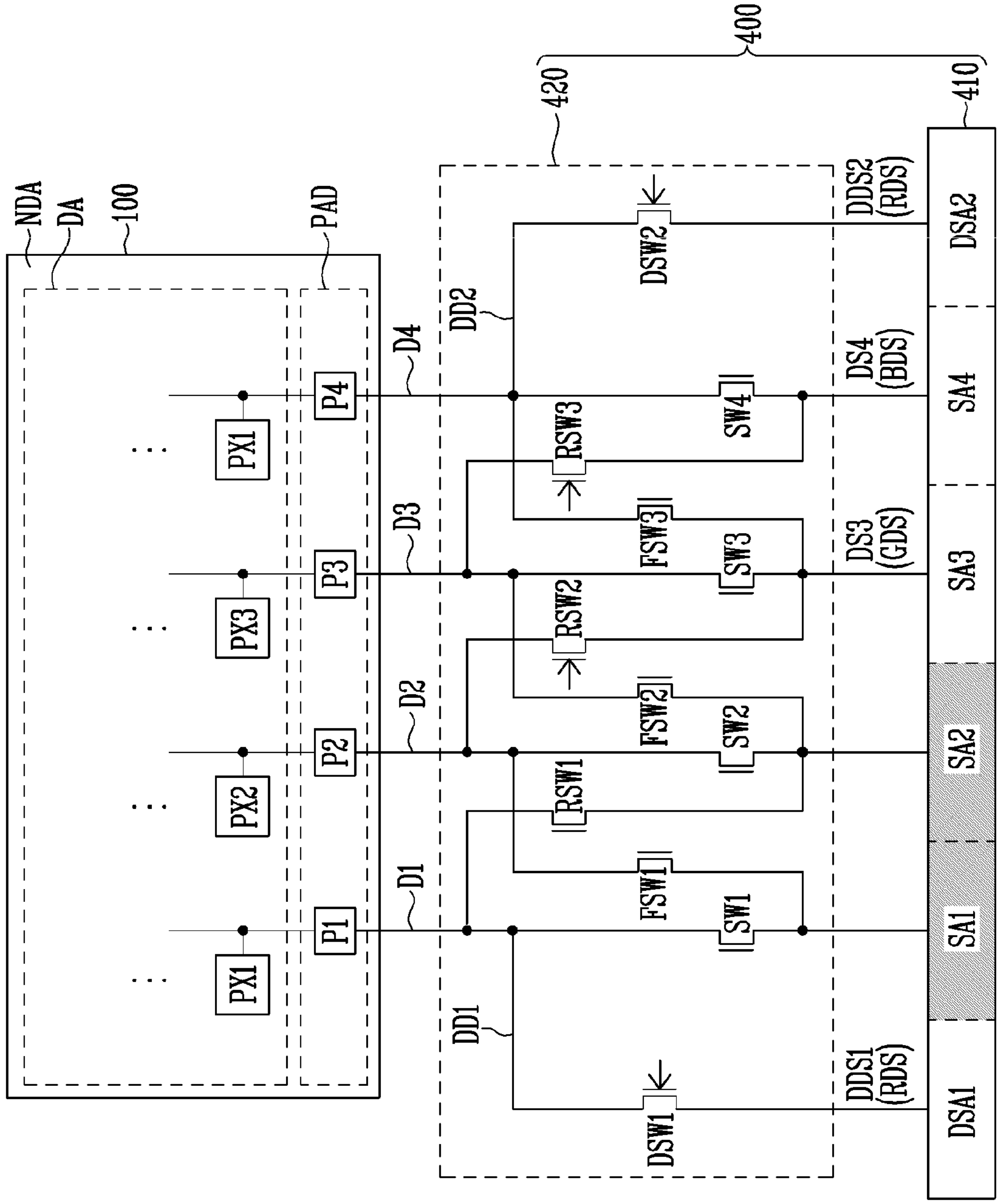

FIGS. 13 to 15 schematically illustrate a method of inspecting the source amplifiers for defects in a case in which the defects occur in source amplifiers that are connected to the first data line D1 and any one data line other than the m-th data line Dm (refer to FIG. 3).

Referring to FIG. 13, the switches SW1, SW2, SW3, and SW4 may be turned on to supply data signals to the data lines D1, D2, D3, and D4. The forward switches FSW1, FSW2, and FSW3, the reverse switches RSW1 RSW2, and RSW3, and the dummy switches DSW1 and DSW2 may be turned off. For example, the third switch SW3 is turned on, so that a third data signal DS3 output from the third source amplifier SA3 is supplied to the third data line D3. The third data signal DS3 may be a blue data signal BDS that is supplied to the third pixels PX3 connected to the third data line D3. Furthermore, the fourth switch SW4 is turned on, so that a fourth data signal DS4 output from the fourth source amplifier SA4 is supplied to the fourth data line D4. The fourth data signal DS4 may be a red data signal RDS that is supplied to the first pixels PX1 connected to the fourth data line D4.

As a result, the third pixels PX3 connected to the third data line D3 and the first pixels PX1 connected to the fourth data line D4 may normally emit light. In contrast, even if the first switch SW1 and the second switch SW2 are turned on, the first pixels PX1 connected to the first data line D1 and the second pixels PX2 connected to the second data line D2 may not normally emit light. However, at this point it is unclear whether the aforementioned abnormal operation results from defects in the first source amplifier SA1 and the second source amplifier SA2 or other defects such as, for example, bonding defects in the data driver 400 and the flexible circuit board.

Referring to FIG. 14, the forward switches FSW1, FSW2, and FSW3 and the first dummy switch DSW1 may be turned on to supply data signals to the data lines D1, D2, D3, and D4. The switches SW1, SW2, SW3, and SW4, the reverse switches RSW1, RSW2, and RSW3, and the second dummy switch DSW2 may be turned off. For example, the first dummy switch DSW1 is turned on, so that a first dummy data signal DDS1 output from the first dummy source amplifier DSA1 is supplied to the first data line D1 via the first dummy data line DD1. The first dummy data signal DDS1 may be a red data signal RDS that is supplied to the first pixels PX1 connected to the first data line D1. Furthermore, the third forward switch FSW3 is turned on, so that a third data signal DS3 output from the third source amplifier SA3 is supplied to the fourth data line D4. The third data signal DS3 may be changed to a red data signal RDS that is supplied to the first pixels PX1 connected to the fourth data line D4. Here, even if the first forward switch FSW1 and the second forward switch FSW2 are turned on, data signals are not supplied to the second data line D2 and the third data line D3 due to defects in the first source amplifier SA1 and the second source amplifier SA2.

As a result, the second pixels PX2 connected to the second data line D2 and the third pixels PX3 connected to the third data line D3 may not normally emit light, while the first pixels PX1 connected to each of the first data line D1 and the fourth data line D4 may normally emit light. Here, since the first pixels PX1 connected to the first data line D1 normally emit light, it can be determined that there are no other defects such as, for example, bonding defects of the data driver 400 and the flexible circuit board. Furthermore, because the second pixels PX2 connected to the second data line D2 do not normally emit light due to the turning on of the first forward switch FSW1 even when the second switch SW2 is turned off, it can be determined that a defect has occurred in the first source amplifier SA1. Furthermore, although the third pixels PX3 connected to the third data line D3 have normally emitted light at a preceding stage (refer to FIG. 13), the third pixels PX3 do not normally emit light due to the turning on of the second forward switch FSW2 and the turning off of the third switch SW3, and it can be determined that a defect has occurred in the second source amplifier SA2.

Referring to FIG. 15, the dummy switches DSW1 and DSW2 and the reverse switches RSW2 and RSW3 may be turned on to supply data signals to the data lines D1, D2, D3, and D4. The switches SW1, SW2, SW3, and SW4, the forward switches FSW1, FSW2, and FSW3, and the first reverse switch RSW1 may be turned off. For example, the first dummy switch DSW1 is turned on, so that a first dummy data signal DDS1 output from the first dummy source amplifier DSA1 is supplied to the first data line D1 via the first dummy data line DD1. Furthermore, the second reverse switch RSW2 is turned on, so that a third data signal DS3 output from the third source amplifier SA3 is supplied to the second data line D2. The third data signal DS3 may be changed to a green data signal GD2 that is supplied to the second pixels PX2 connected to the second data line D2. Furthermore, the third reverse switch RSW3 is turned on, so that a fourth data signal DS4 output from the fourth source amplifier SA4 is supplied to the third data line D3. The fourth data signal DS4 may be changed to a blue data signal BDS that is supplied to the third pixels PX3 connected to the third data line D3. Furthermore, the second dummy switch DSW2 is turned on, so that a second dummy data signal DDS2 output from the second dummy source amplifier DSA2 is supplied to the fourth data line D4 via the second dummy data line DD2. The second dummy data signal DDS2 may be a red data signal RDS that is supplied to the first pixels PX1 connected to the fourth data line D4.

As a result, the first pixels PX1 connected to each of the first data line D1 and the fourth data line D4, the second pixels PX2 connected to the second data line D2, and the third pixels PX3 connected to the third data line D3 all emit light normally. In other words, even if defects occur in two source amplifiers SA1 and SA2, the display panel 100 may be normally driven without the need for module replacement.

Figure 16:
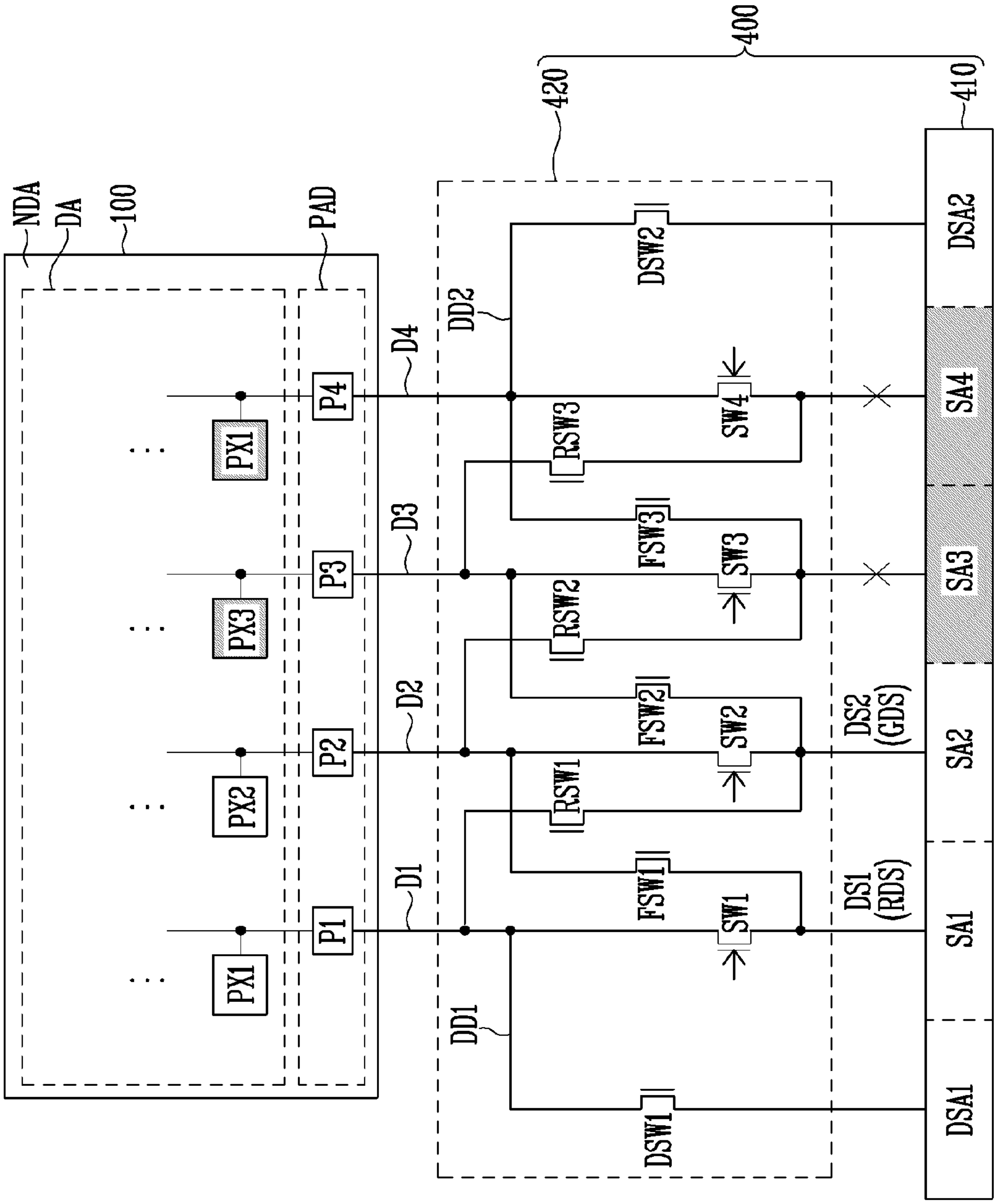
Figure 17:
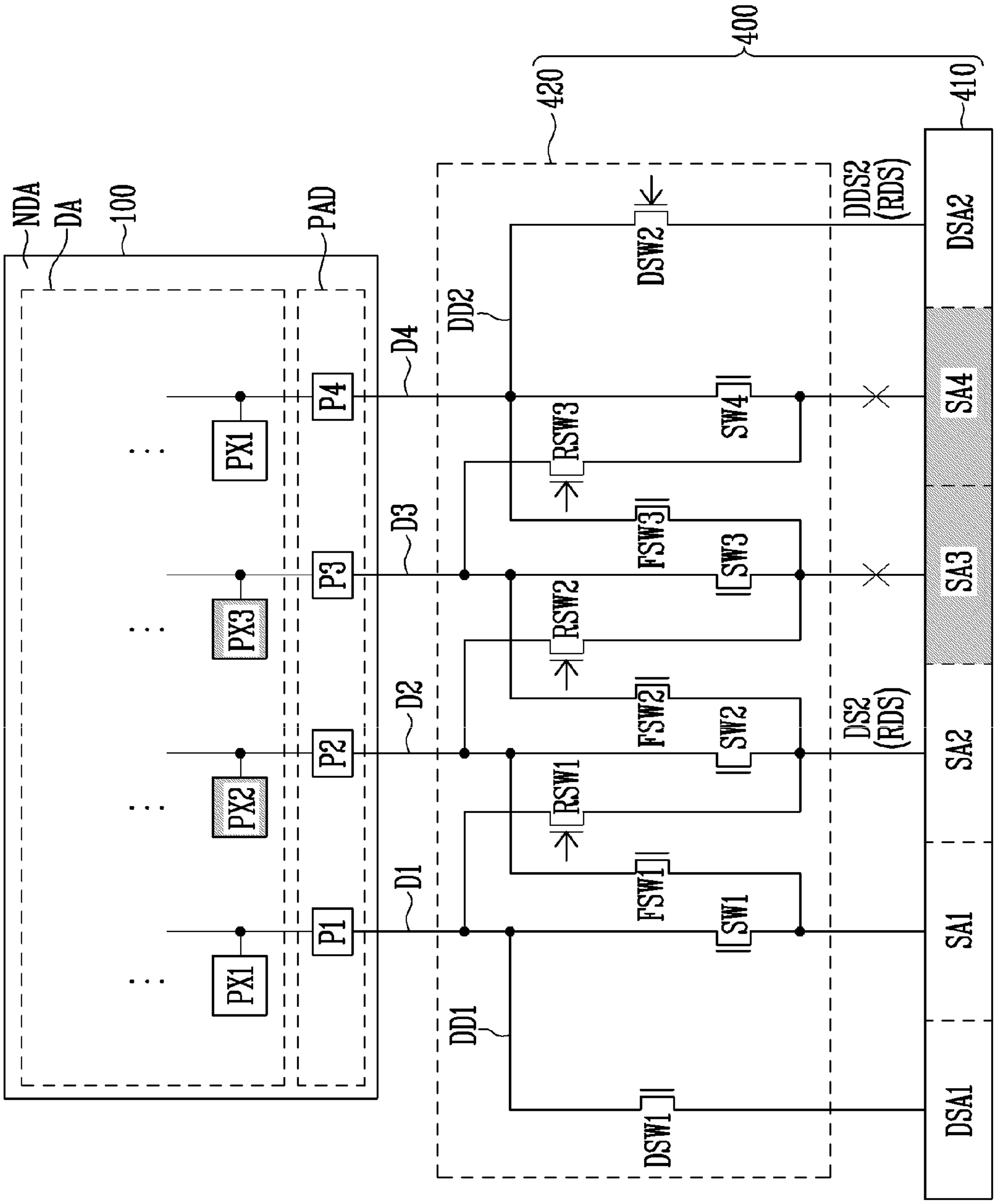
Figure 18:
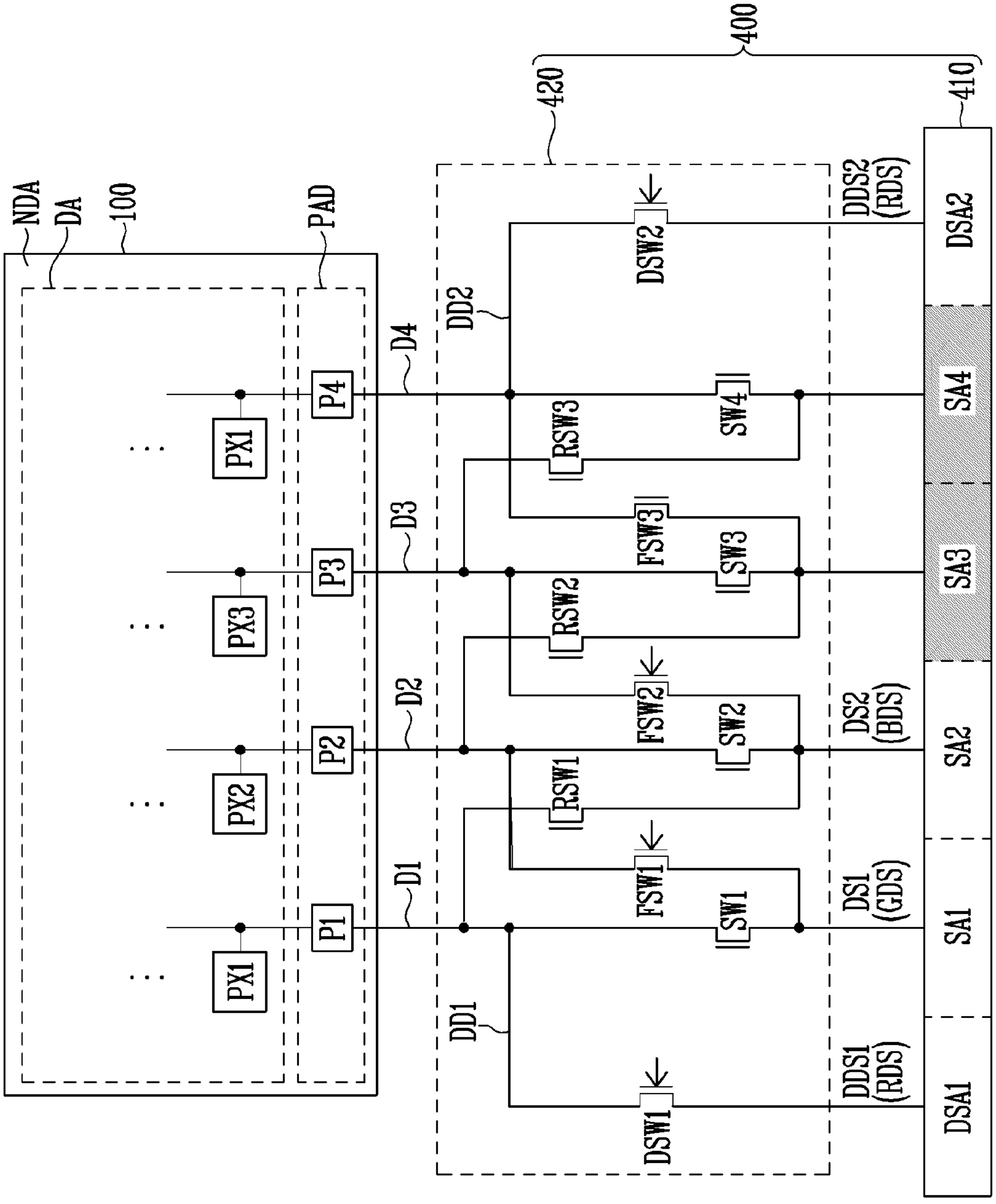

FIGS. 16 to 18 schematically illustrate a method of inspecting the source amplifiers for defects in a case in which the defects occur in source amplifiers that are connected to the m-th data line Dm (refer to FIG. 3) and any one data line other than the first data line D1.

Referring to FIG. 16, the switches SW1, SW2, SW3, and SW4 may be turned on to supply data signals to the data lines D1, D2, D3, and D4. The forward switches FSW1, FSW2, and FSW3, the reverse switches RSW1 RSW2, and RSW3, and the dummy switches DSW1 and DSW2 may be turned off. For example, the first switch SW1 is turned on, so that a first data signal DS1 output from the first source amplifier SA1 is supplied to the first data line D1. The first data signal DS1 may be a red data signal RDS that is supplied to the first pixels PX1 connected to the first data line D1. Furthermore, the second switch SW2 is turned on, so that a second data signal DS2 output from the second source amplifier SA2 is supplied to the second data line D2. The second data signal DS2 may be a green data signal GD2 that is supplied to the second pixels PX2 connected to the second data line D2.

As a result, the first pixels PX1 connected to the first data line D1 and the second pixels PX2 connected to the second data line D2 may normally emit light. In contrast, even if the third switch SW3 and the fourth switch SW4 are turned on, the third pixels PX3 connected to the third data line D3 and the first pixels PX1 connected to the fourth data line D4 may not normally emit light. However, at this point it is unclear whether the aforementioned abnormal operation results from defects in the third source amplifier SA3 or the fourth source amplifier SA4 or other defects such as, for example, bonding defects in the data driver 400 and the flexible circuit board.

Referring to FIG. 17, the reverse switches RSW1, RSW2, and RSW3 and the second dummy switch DSW2 may be turned on to supply data signals to the data lines D1, D2, D3, and D4. The switches SW1, SW2, SW3, and SW4, the forward switches FSW1, FSW2, and FSW3, and the first dummy switch DSW1 may be turned off. For example, the first reverse switch RSW1 is turned on, so that a second data signal DS2 output from the second source amplifier SA2 is supplied to the first data line D1. The second data signal DS2 may be changed to a red data signal RDS that is supplied to the first pixels PX1 connected to the first data line D1. Furthermore, the second dummy switch DSW2 is turned on, so that a second dummy data signal DDS2 output from the second dummy source amplifier DSA2 is supplied to the fourth data line D4 via the second dummy data line DD2. The second dummy data signal DDS2 may be a red data signal RDS that is supplied to the first pixels PX1 connected to the fourth data line D4. Here, even if the second reverse switch RSW2 and the third reverse switch RSW3 are turned on, data signals are not supplied to the second data line D2 and the third data line D3 due to defects in the third source amplifier SA3 and the fourth source amplifier SA4.

As a result, the second pixels PX2 connected to the second data line D2 and the third pixels PX3 connected to the third data line D3 may not normally emit light, while the first pixels PX1 connected to each of the first data line D1 and the fourth data line D4 may normally emit light. Here, since the first pixels PX1 connected to the fourth data line D4 normally emit light, it can be determined that there are no other defects such as, for example, bonding defects of the data driver 400 and the flexible circuit board. Furthermore, although the second pixels PX2 connected to the second data line D2 have normally emitted light at a preceding stage (refer to FIG. 16), the second pixels PX2 do not normally emit light due to the turning on of the second reverse switch RSW2 and the turning off of the second switch SW2. Consequently, it can be determined that a defect has occurred in the third source amplifier SA3. Furthermore, because the third pixels PX3 connected to the third data line D3 do not normally emit light due to the turning on of the third reverse switch RSW3 even when the third switch SW3 is turned off, it can be determined that a defect has occurred in the fourth source amplifier SA4.

Referring to FIG. 18, the dummy switches DSW1 and DSW2 and the forward switches RSW1 and RSW2 may be turned on to supply data signals to the data lines D1, D2, D3, and D4. The switches SW1, SW2, SW3, and SW4, the reverse switches RSW1, RSW2, and RSW3, and the third forward switch FSW3 may be turned off. For example, the first dummy switch DSW1 is turned on, so that a first dummy data signal DDS1 output from the first dummy source amplifier DSA1 is supplied to the first data line D1 via the first dummy data line DD1. Furthermore, the first forward switch FSW1 is turned on, so that a first data signal DS1 output from the first source amplifier SA1 is supplied to the second data line D2. The first data signal DS1 may be changed to a green data signal GD2 that is supplied to the second pixels PX2 connected to the second data line D2. Furthermore, the second forward switch FSW2 is turned on so that a second data signal DS2 output from the second source amplifier SA2 can be supplied to the third data line D3. The second data signal DS2 may be changed to a blue data signal BDS that is supplied to the third pixels PX3 connected to the third data line D3. Furthermore, the second dummy switch DSW2 is turned on, so that a second dummy data signal DDS2 output from the second dummy source amplifier DSA2 is supplied to the fourth data line D4 via the second dummy data line DD2.

As a result, the first pixels PX1 connected to each of the first data line D1 and the fourth data line D4, the second pixels PX2 connected to the second data line D2, and the third pixels PX3 connected to the third data line D3 all emit light normally. In other words, even if defects occur in two source amplifiers SA3 and SA4, the display panel 100 may be normally driven without the need for module replacement.

Figure 19:
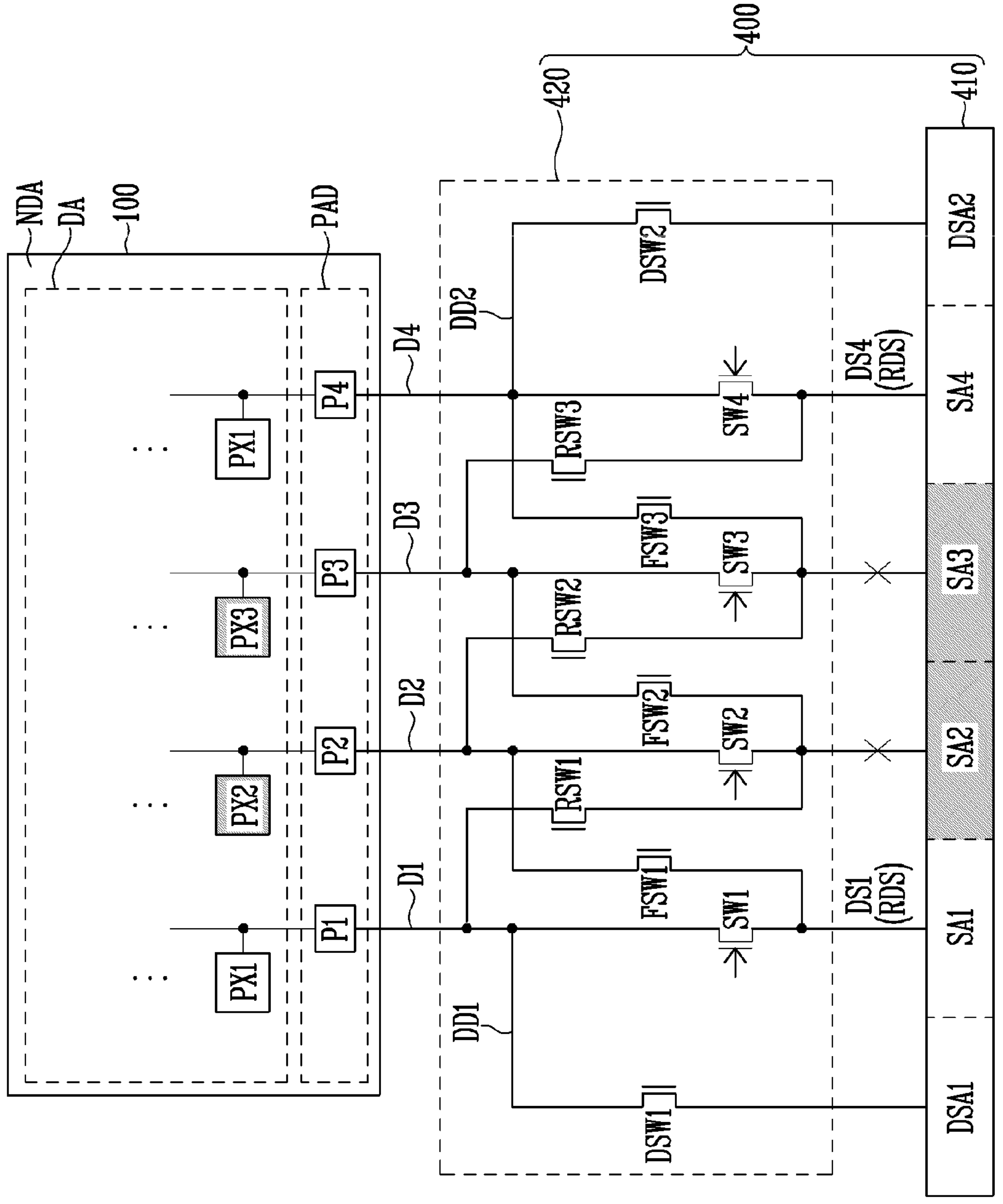
Figure 20:
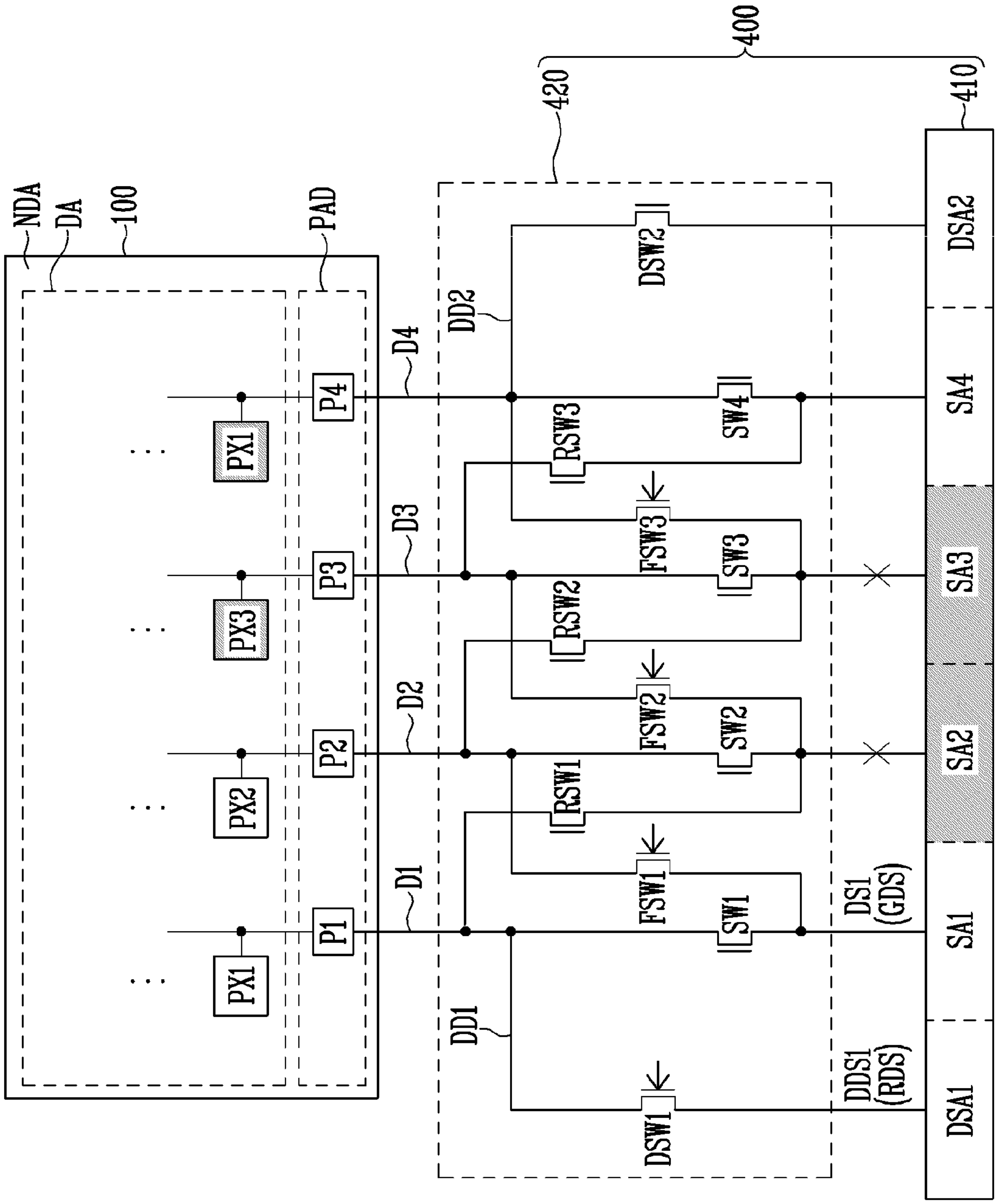
Figure 21:
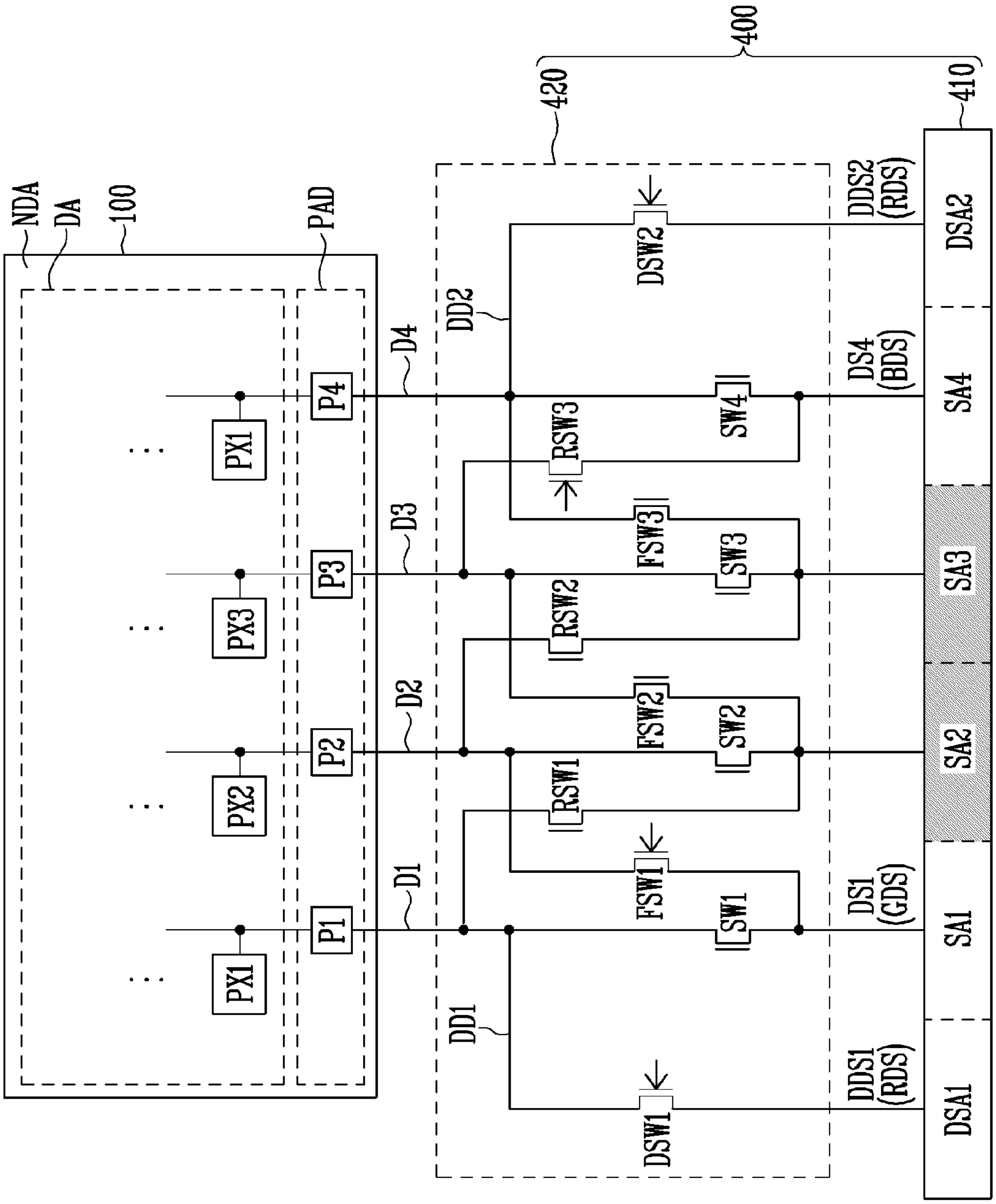

FIGS. 19 to 21 schematically illustrate a method of inspecting the source amplifiers for defects in a case in which the defects occur in source amplifiers that are respectively connected to any two data lines other than the first data line D1 and the m-th data line Dm (refer to FIG. 3).

Referring to FIG. 19, the switches SW1, SW2, SW3, and SW4 may be turned on to supply data signals to the data lines D1, D2, D3, and D4. The forward switches FSW1, FSW2, and FSW3, the reverse switches RSW1 RSW2, and RSW3, and the dummy switches DSW1 and DSW2 may be turned off. For example, the first switch SW1 is turned on, so that a first data signal DS1 output from the first source amplifier SA1 is supplied to the first data line D1. The first data signal DS1 may be a red data signal RDS that is supplied to the first pixels PX1 connected to the first data line D1. Furthermore, the fourth switch SW4 is turned on, so that a fourth data signal DS4 output from the fourth source amplifier SA4 is supplied to the fourth data line D4. The fourth data signal DS4 may be a red data signal RDS that is supplied to the first pixels PX1 connected to the fourth data line D4.

As a result, the first pixels PX1 connected to each of the first data line D1 and the fourth data line D4 may normally emit light. In contrast, even if the second switch SW2 and the third switch SW3 are turned on, the second pixels PX2 connected to the second data line D2 and the third pixels PX3 connected to the third data line D3 may not normally emit light. However, at this point it is unclear whether the aforementioned abnormal operation results from defects in the second source amplifier SA2 or the third source amplifier SA3 or other defects such as, for example, bonding defects in the data driver 400 and the flexible circuit board.

Referring to FIG. 20, the forward switches FSW1, FSW2, and FSW3 and the first dummy switch DSW1 may be turned on to supply data signals to the data lines D1, D2, D3, and D4. The switches SW1, SW2, SW3, and SW4, the reverse switches RSW1, RSW2, and RSW3, and the second dummy switch DSW2 may be turned off. For example, the first dummy switch DSW1 is turned on, so that a first dummy data signal DDS1 output from the first dummy source amplifier DSA1 is supplied to the first data line D1 via the first dummy data line DD1. Furthermore, the first forward switch FSW1 is turned on, so that a first data signal DS1 output from the first source amplifier SA1 is supplied to the second data line D2. The first data signal DS1 may be changed to a green data signal GD2 that is supplied to the second pixels PX2 connected to the second data line D2. Here, even if the second forward switch FSW2 and the third forward switch FSW3 are turned on, data signals are not supplied to the third data line D3 and the fourth data line D4 due to defects in the second source amplifier SA2 and the third source amplifier SA3. However, the present disclosure is not limited to the aforementioned example. The reverse switches RSW1, RSW2, and RSW3 and the second dummy switch DSW2 may be turned on to supply data signals to the data lines D1, D2, D3, and D4. The switches SW1, SW2, SW3, and SW4, the forward switches FSW1, FSW2 and FSW3, and the first dummy switch DSW1 may be turned on.

As a result, the third pixels PX3 connected to the third data line D3 and the first pixels PX1 connected to the fourth data line D4 may not normally emit light, while the first pixels PX1 connected to the first data line D1 and the second pixels PX2 connected to the second data line D2 may normally emit light. Here, since the second pixels PX2 connected to the second data line D2 normally emit light, it can be determined that there are no other defects such as, for example, bonding defects of the data driver 400 and the flexible circuit board. Furthermore, because the third pixels PX3 connected to the third data line D3 do not normally emit light due to the turning on of the second forward switch FSW2 even when the third switch SW3 is turned off, it can be determined that a defect has occurred in the second source amplifier SA2. Furthermore, although the first pixels PX1 connected to the fourth data line D4 have normally emitted light at a preceding stage (refer to FIG. 19), the first pixels PX1 do not normally emit light due to the turning on of the third forward switch FSW3 and the turning off of the fourth switch SW4, it can be determined that a defect has occurred in the third source amplifier SA3.

Referring to FIG. 21, the dummy switches DSW1 and DSW2, the first forward switch FSW1, and the third reverse switch RSW3 may be turned on to supply data signals to the data lines D1, D2, D3, and D4. The switches SW1, SW2, SW3, and SW4, the forward switches FSW1 and FSW2, and the reverse switches RSW1 and RSW2 may be turned off. For example, the first dummy switch DSW1 is turned on, so that a first dummy data signal DDS1 output from the first dummy source amplifier DSA1 is supplied to the first data line D1 via the first dummy data line DD1. Furthermore, the first forward switch FSW1 is turned on, so that a first data signal DS1 output from the first source amplifier SA1 is supplied to the second data line D2. Furthermore, the third reverse switch RSW3 is turned on, so that a fourth data signal DS4 output from the fourth source amplifier SA4 is supplied to the third data line D3. The fourth data signal DS4 may be changed to a blue data signal BDS that is supplied to the third pixels PX3 connected to the third data line D3. Furthermore, the second dummy switch DSW2 is turned on, so that a second dummy data signal DDS2 output from the second dummy source amplifier DSA2 is supplied to the fourth data line D4 via the second dummy data line DD2.

As a result, the first pixels PX1 connected to each of the first data line D1 and the fourth data line D4, the second pixels PX2 connected to the second data line D2, and the third pixels PX3 connected to the third data line D3 all emit light normally. In other words, even if defects occur in two source amplifiers SA2 and SA3, the display panel 100 may be normally driven without the need for module replacement.

Figure 22:
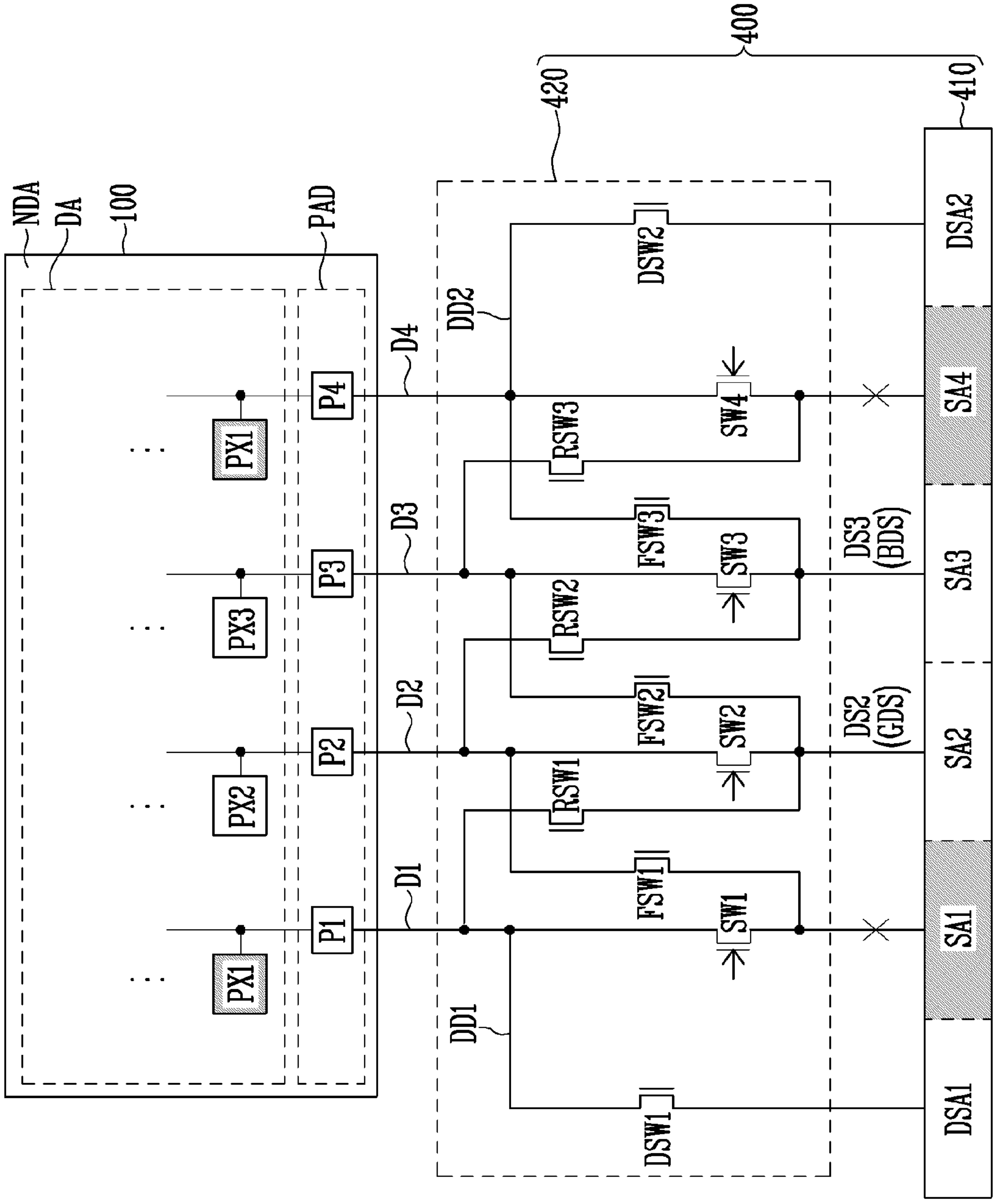
Figure 23:
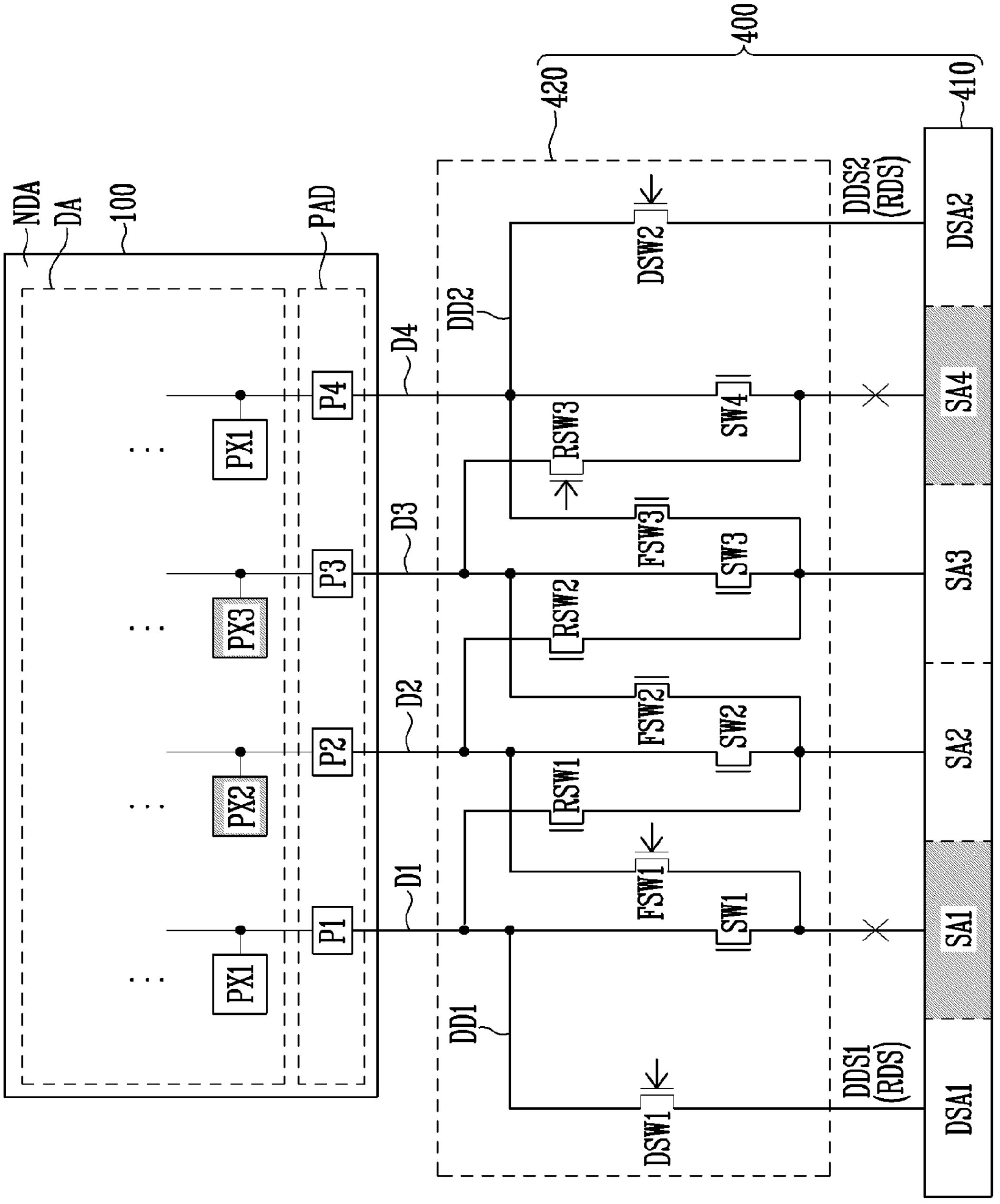
Figure 24:
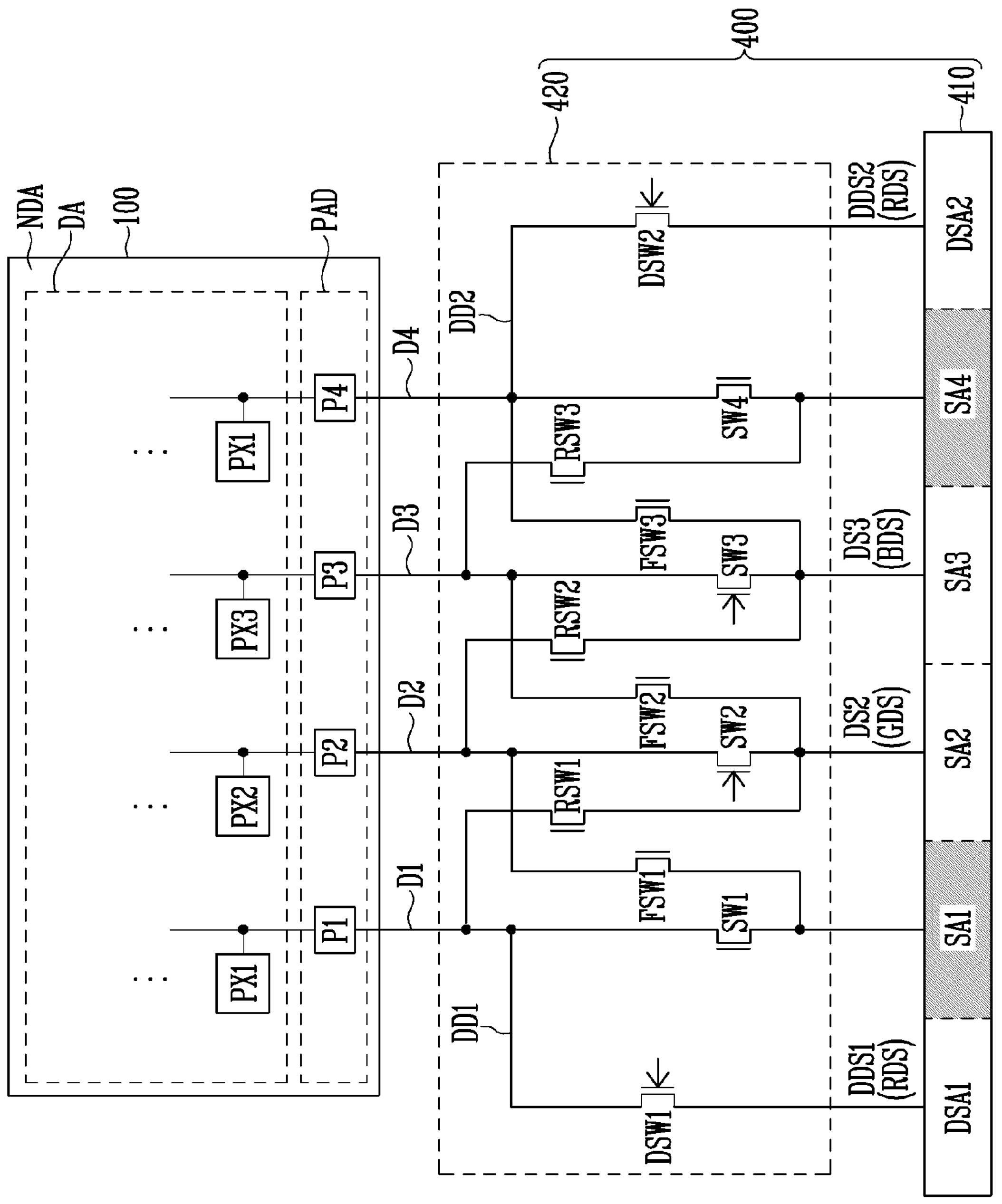

FIGS. 22 to 24 schematically illustrate a method of inspecting the source amplifiers for defects in a case in which the defects occur in source amplifiers that are respectively connected to the first data line D1 and the m-th data line Dm (refer to FIG. 3).

Referring to FIG. 22, the switches SW1, SW2, SW3, and SW4 may be turned on to supply data signals to the data lines D1, D2, D3, and D4. The forward switches FSW1, FSW2, and FSW3, the reverse switches RSW1 RSW2, and RSW3, and the dummy switches DSW1 and DSW2 may be turned off. For example, the second switch SW2 is turned on so that a second data signal DS2 output from the second source amplifier SA2 can be supplied to the second data line D2. The second data signal DS2 may be a green data signal GD2 that is supplied to the second pixels PX2 connected to the second data line D2. Furthermore, the third switch SW3 is turned on, so that a third data signal DS3 output from the third source amplifier SA3 is supplied to the third data line D3. The third data signal DS3 may be a blue data signal BDS that is supplied to the third pixels PX3 connected to the third data line D3.

As a result, the second pixels PX2 connected to the second data line D2 and the third pixels PX3 connected to the third data line D3 may normally emit light. In contrast, even if the first switch SW1 and the fourth switch SW4 are turned on, the first pixels PX1 connected to each of the first data line D1 and the fourth data line D4 may not normally emit light. However, at this point it is unclear whether the aforementioned abnormal operation results from defects in the first source amplifier SA1 and the fourth source amplifier SA4 or other defects such as, for example, bonding defects in the data driver 400 and the flexible circuit board.

Referring to FIG. 23, the dummy switches DSW1 and DSW2, the first forward switch FSW1, and the third reverse switch RSW3 may be turned on to supply data signals to the data lines D1, D2, D3, and D4. The switches SW1, SW2, SW3, and SW4, the forward switches FSW1 and FSW2, and the reverse switches RSW1 and RSW2 may be turned off. For example, the first dummy switch DSW1 is turned on, so that a first dummy data signal DDS1 output from the first dummy source amplifier DSA1 is supplied to the first data line D1 via the first dummy data line DD1. The first dummy data signal DDS1 may be a red data signal RDS that is supplied to the first pixels PX1 connected to the first data line D1. Furthermore, the second dummy switch DSW2 is turned on, so that a second dummy data signal DDS2 output from the second dummy source amplifier DSA2 is supplied to the fourth data line D4 via the second dummy data line DD2. The second dummy data signal DDS2 may be a red data signal RDS that is supplied to the first pixels PX1 connected to the fourth data line D4. Here, even if the first forward switch FSW1 and the third reverse switch RSW3 are turned on, data signals are not supplied to the second data line D2 and the third data line D3 due to defects in the first source amplifier SA1 and the fourth source amplifier SA4.

As a result, the second pixels PX2 connected to the second data line D2 and the third pixels PX3 connected to the third data line D3 may not normally emit light, while the first pixels PX1 connected to each of the first data line D1 and the fourth data line D4 may normally emit light. Here, since the first pixels PX1 connected to each of the first data line D1 and the fourth data line D4 normally emit light, it can be determined that there are no other defects such as, for example, bonding defects of the data driver 400 and the flexible circuit board. Furthermore, although the second pixels PX2 connected to the second data line D2 have normally emitted light at a preceding stage (refer to FIG. 22), the second pixels PX2 do not normally emit light due to the turning on of the first forward switch FSW1 and the turning off of the second switch SW2, and it can be determined that a defect has occurred in the first source amplifier SA1. Furthermore, although the third pixels PX3 connected to the third data line D3 have normally emitted light at a preceding stage (refer to FIG. 22), the third pixels PX3 do not normally emit light due to the turning on of the third reverse switch RSW3 and the turning off of the third switch SW3. Therefore, it can be determined that a defect has occurred in the fourth source amplifier SA4.

Referring to FIG. 24, the dummy switches DSW1 and DSW2 and the switches SW2 and SW3 may be turned on to supply data signals to the data lines D1, D2, D3, and D4. The switches SW1 and SW4, the forward switches FSW1, FSW2, and FSW3, and the reverse switches RSW1, RSW2, and RSW3 may be turned off. For example, the first dummy switch DSW1 is turned on, so that a first dummy data signal DDS1 output from the first dummy source amplifier DSA1 is supplied to the first data line D1 via the first dummy data line DD1. Furthermore, the second switch SW2 is turned on, so that a second data signal DS2 output from the second source amplifier SA2 is supplied to the second data line D2. Furthermore, the third switch SW3 is turned on, so that a third data signal DS3 output from the third source amplifier SA3 is supplied to the third data line D3. Furthermore, the second dummy switch DSW2 is turned on, so that a second dummy data signal DDS2 output from the second dummy source amplifier DSA2 is supplied to the fourth data line D4 via the second dummy data line DD2.

As a result, the first pixels PX1 connected to each of the first data line D1 and the fourth data line D4, the second pixels PX2 connected to the second data line D2, and the third pixels PX3 connected to the third data line D3 all emit light normally. In other words, even if defects occur in two source amplifiers SA1 and SA4, the display panel 100 may be normally driven without the need for module replacement.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

In accordance with embodiments of the present disclosure, an electrical defect of a data driver may be accurately detected, and a display device may be normally driven without the need to replace the data driver in which the electrical defect has been detected. Therefore, the reliability and accuracy of defect inspection may be improved, and costs associated with module replacement may be reduced.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A display device, comprising:

a display panel including a plurality of pixels connected to m data lines, wherein m is a positive integer greater than or equal to 3; and a data driver configured to supply a plurality of data signals to the m data lines, wherein the data driver comprises:

an output component comprising m source amplifiers respectively connected to the m data lines, and a first dummy source amplifier connected to a first dummy data line; and a switching component comprising m switches respectively formed on the m data lines, m−1 forward switches formed between adjacent data lines among the m data lines, m−1 reverse switches formed between the adjacent data lines, and a first dummy switch formed on the first dummy data line, wherein, when a defect occurs in a pixel among the plurality of pixels connected to any one data line among the m data lines other than an m-th data line among the m data lines, the m−1 forward switches and the first dummy switch are turned on, and the m switches are turned off.

2. The display device according to claim 1, wherein the first dummy source amplifier is adjacent to a first source amplifier configured to output a data signal to a first data line among the m data lines.

3. The display device according to claim 2, wherein the first dummy data line is connected to the first data line.

4. The display device according to claim 2, wherein the first dummy switch controls whether to supply a first dummy data signal output from the first dummy source amplifier to the first data line.

5. The display device according to claim 1, wherein a k-th switch controls whether to supply a data signal among the plurality of data signals output from a k-th source amplifier among the m source amplifiers to a k-th data line among the m data lines, wherein k is a positive integer less than or equal to m.

6. The display device according to claim 1, wherein a p-th forward switch among the m−1 forward switches controls whether to supply a data signal among the plurality of data signals output from a p-th source amplifier among the m source amplifiers to a p+1-th data line among the m data lines, wherein p is a positive integer of less than or equal to m−1.

7. The display device according to claim 1, wherein a q-th reverse switch among the m−1 reverse switches controls whether to supply a data signal among the plurality of data signals output from a q-th source amplifier among the m source amplifiers to a q−1-th data line among the m data lines, wherein q is a positive integer less than or equal to m−1.

8. The display device according to claim 1, wherein the output component further comprises a second dummy source amplifier connected to a second dummy data line, and wherein the switching component further comprises a second dummy switch formed on the second dummy data line.

9. The display device according to claim 8, wherein the second dummy source amplifier is adjacent to an m-th source amplifier among the m source amplifiers configured to output a data signal among the plurality of data signals to an m-th data line among the m data lines.

10. The display device according to claim 9, wherein the second dummy data line is connected to the m-th data line.

11. The display device according to claim 9, wherein the second dummy switch controls whether to supply a dummy data signal output from the second dummy source amplifier to the m-th data line.

12. The display device according to claim 8, wherein when a defect occurs in a pixel among the plurality of pixels connected to an m-th data line among the m data lines, the m−1 reverse switches and the second dummy switch are turned on, and the m switches and the first dummy switch are turned off.

13. The display device according to claim 8, wherein, when a defect occurs in a pixel among the plurality of pixels connected to a first data line among the m data lines and any one data line other than an m-th data line among the m data lines, the m−1 forward switches and the first dummy switch are turned on, and the m switches, the m−1 reverse switches, and the second dummy switch are turned off.

14. The display device according to claim 8, wherein, when a defect occurs in a pixel among the plurality of pixels connected to an m-th data line among the m data lines and any one data line other than a first data line among the m data lines, the m−1 reverse switches and the second dummy switch are turned on, and the m switches, the m−1 forward switches, and the first dummy switch are turned off.

15. The display device according to claim 8, wherein, when m is a positive integer greater than or equal to 4, when a defect occurs in a pixel among the plurality of pixels connected to any two data lines among the m data lines other than a first data line among the m data lines and an m-th data line among the m data lines, the m−1 forward switches and the first dummy switch are turned on, and the m switches, the m−1 reverse switches, and the second dummy switch are turned off, or the m−1 reverse switches and the second dummy switch are turned on, and the m switches, the m−1 forward switches, and the first dummy switch are turned off.

16. The display device according to claim 8, wherein, when m is a positive integer greater than or equal to 4, when a defect occurs in a pixel among the plurality of pixels connected to a first data line among the m data lines and an m-th data line among the m data lines, the first dummy switch, a first forward switch among the m−1 forward switches, the second dummy switch, and an m−1-th reverse switch among the m−1 reverse switches are turned on, and the m switches, remaining m−2 forward switches among the m−1 forward switches, and remaining m−2 reverse switches among the m−1 reverse switches are turned off.

17. The display device according to claim 8, wherein, when a defect occurs in any two source amplifiers among the m source amplifiers, a first dummy data signal output from the first dummy source amplifier is supplied to a first data line among the m data lines, and a second dummy data signal output from the second dummy source amplifier is supplied to an m-th data line among the m data lines.

18. The display device according to claim 1, wherein, when a defect occurs in any one source amplifier among the m source amplifiers, a first dummy data signal output from the first dummy source amplifier is supplied to a first data line among the m data lines.

* * * * *